United States Patent
Kitsuregawa et al.

(10) Patent No.: US 9,177,027 B2
(45) Date of Patent: Nov. 3, 2015

(54) DATABASE MANAGEMENT SYSTEM AND METHOD

(75) Inventors: Masaru Kitsuregawa, Tokyo (JP); Kazuo Goda, Tokyo (JP)

(73) Assignee: Masaru Kitsuregawa, Tokyo (JP)

( * ) Notice: Subject to any disclaimer, the term of this patent is extended or adjusted under 35 U.S.C. 154(b) by 83 days.

(21) Appl. No.: 13/527,951

(22) Filed: Jun. 20, 2012

(65) Prior Publication Data

US 2012/0259838 A1    Oct. 11, 2012

Related U.S. Application Data

(63) Continuation of application No. 13/233,578, filed on Sep. 15, 2011, now Pat. No. 8,224,812, which is a continuation of application No. 12/897,243, filed on Oct. 4, 2010, now Pat. No. 8,041,707, which is a continuation of application No. 11/490,172, filed on Jul. 21, 2006, now Pat. No. 7,827,167.

(30) Foreign Application Priority Data

Jul. 22, 2005    (JP) .................................. 2005-213090

(51) Int. Cl.
*G06F 17/30*    (2006.01)

(52) U.S. Cl.
CPC .... *G06F 17/30474* (2013.01); *G06F 17/30433* (2013.01); *G06F 17/30513* (2013.01)

(58) Field of Classification Search
USPC .......................................... 707/713, 718, 764
See application file for complete search history.

(56) References Cited

U.S. PATENT DOCUMENTS

| | | | |
|---|---|---|---|
| 5,742,816 A * | 4/1998 | Barr et al. ...................... 707/728 |
| 6,009,265 A | 12/1999 | Huang et al. |
| 6,108,653 A | 8/2000 | Pereira |
| 6,353,818 B1 | 3/2002 | Carino, Jr. |
| 6,470,333 B1 * | 10/2002 | Baclawski ............................ 1/1 |
| 6,629,094 B1 * | 9/2003 | Colby et al. .................. 707/713 |
| 6,816,854 B2 | 11/2004 | Reiner et al. |
| 7,024,414 B2 * | 4/2006 | Sah et al. ............................... 1/1 |
| 7,657,501 B1 | 2/2010 | Brown et al. |
| 7,814,093 B2 * | 10/2010 | Meyers et al. ................. 707/714 |
| 2004/0117398 A1 | 6/2004 | Idei et al. |
| 2004/0143571 A1 | 7/2004 | Bjornson et al. |
| 2005/0131893 A1 | 6/2005 | Von Glan |
| 2006/0080285 A1 * | 4/2006 | Chowdhuri ....................... 707/3 |
| 2006/0218118 A1 | 9/2006 | Gupta |

FOREIGN PATENT DOCUMENTS

JP    2002-523839    7/2002

* cited by examiner

*Primary Examiner* — Sherief Badawi
*Assistant Examiner* — Christopher J Raab
(74) *Attorney, Agent, or Firm* — Mattingly & Malur, PC

(57) ABSTRACT

A database management system has a query interface for receiving a query and a query executor for executing the received query. The query executor dynamically generates a task, and executes a plurality of tasks in parallel. In execution of each task, each time data is required to be read from a database, the query executor generates a task for acquiring the data, and in execution of the generated task, issues a data read request for reading the data from the database, to thereby shorten a time taken to execute each task.

18 Claims, 16 Drawing Sheets

| NAME | PID | LINEID | OID | CUSTID |
|---|---|---|---|---|
| BX01 | 301 | 1 | 500 | AAA |
| BX01 | 301 | 3 | 503 | YYY |
| CX01 | 302 | 3 | 501 | BBB |
| CX01 | 302 | 3 | 502 | XXX |

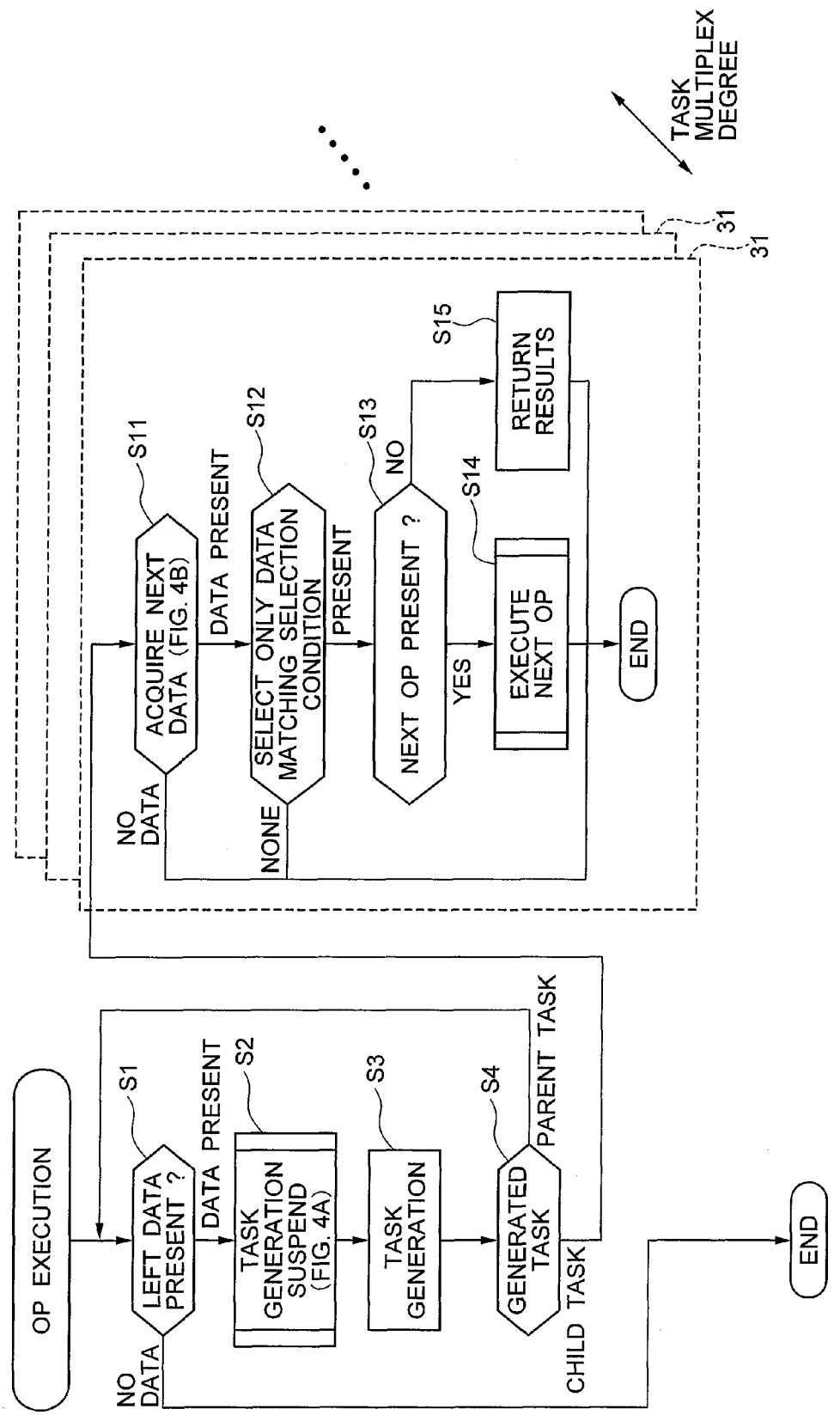

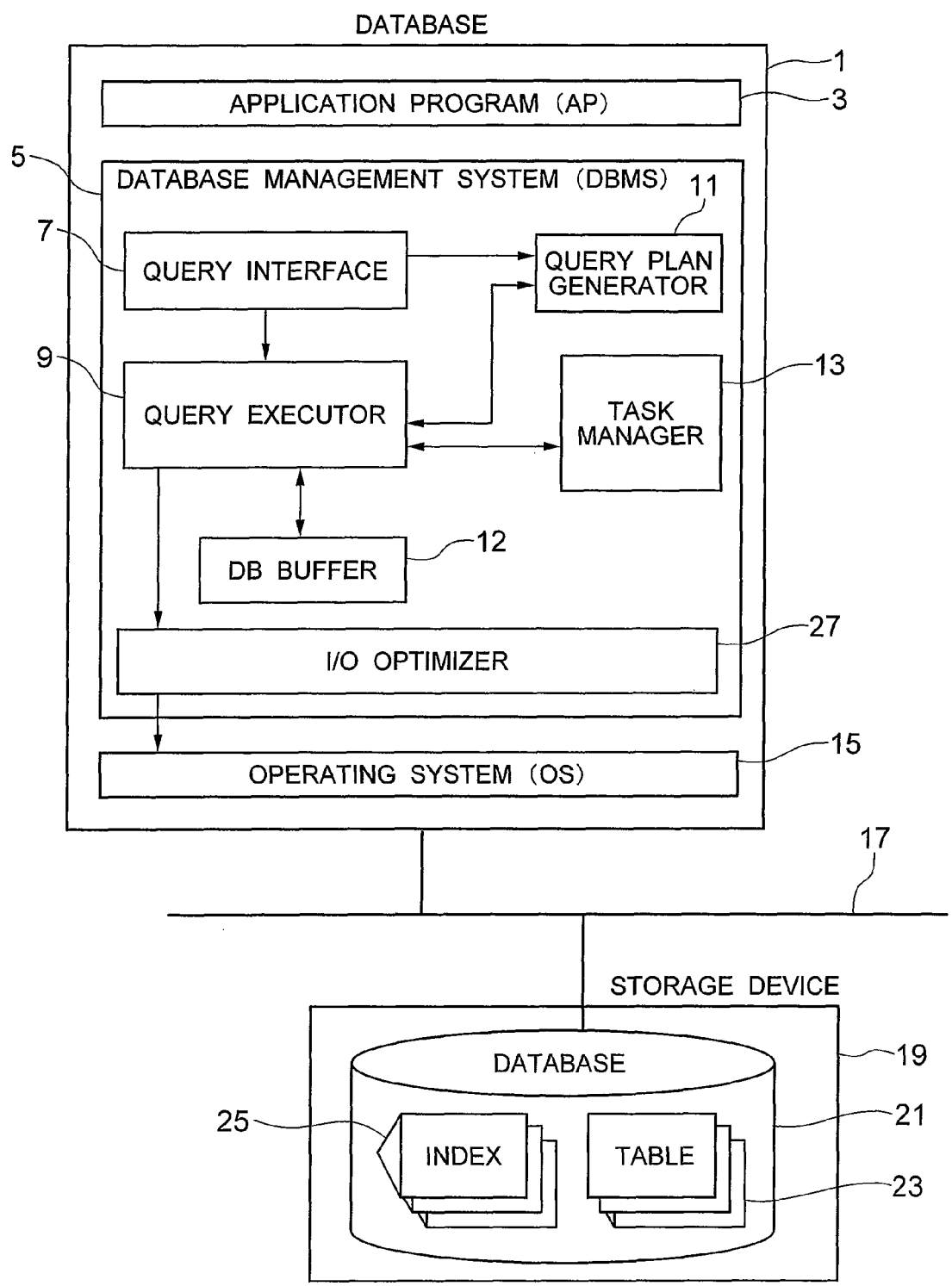

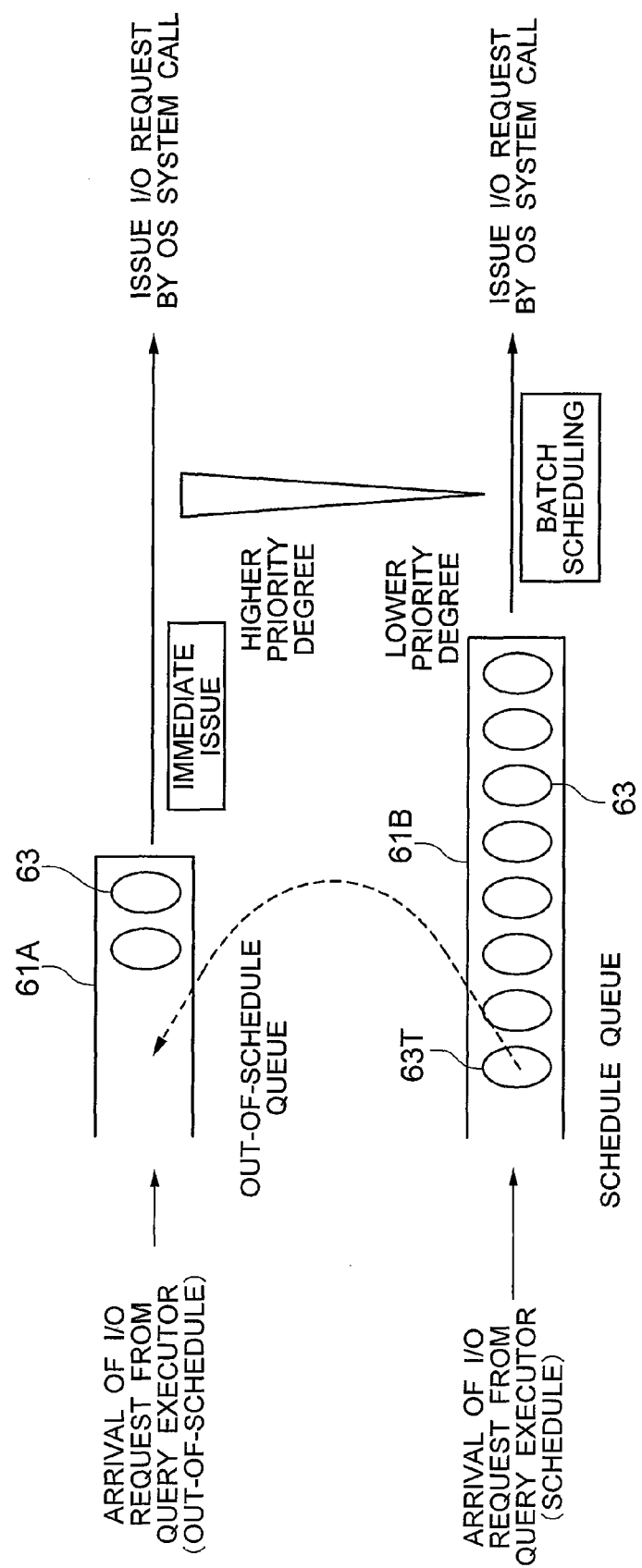

FIG. 14A
| DATA ACQUISITION ORDER NUMBER | TASK ID |
|---|---|
| 101 | 5351 |
| 102 | 5367 |
| 103 | 5361 |
| ⋮ | ⋮ |
71
71R
71R
FIG. 14B
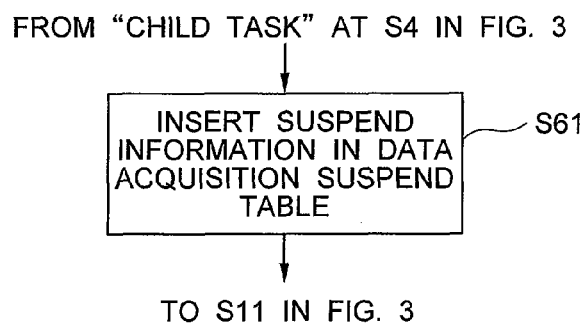
FROM "CHILD TASK" AT S4 IN FIG. 3
S61: INSERT SUSPEND INFORMATION IN DATA ACQUISITION SUSPEND TABLE
TO S11 IN FIG. 3
FIG. 14C
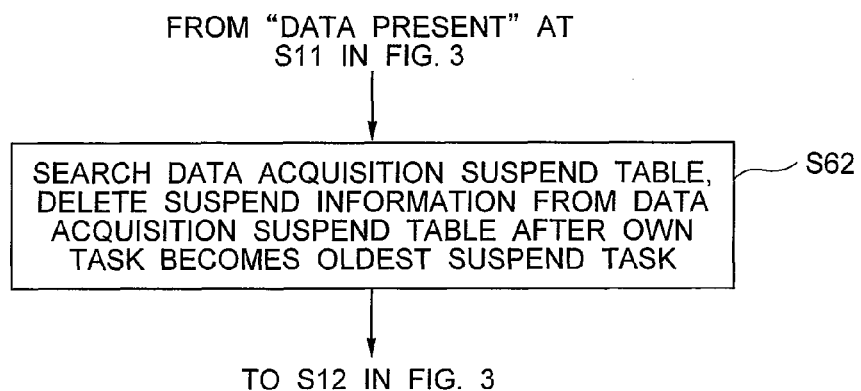
FROM "DATA PRESENT" AT S11 IN FIG. 3
S62: SEARCH DATA ACQUISITION SUSPEND TABLE, DELETE SUSPEND INFORMATION FROM DATA ACQUISITION SUSPEND TABLE AFTER OWN TASK BECOMES OLDEST SUSPEND TASK
TO S12 IN FIG. 3

DATABASE MANAGEMENT SYSTEM AND METHOD

CROSS-REFERENCES

This is a continuation application of U.S. Ser. No. 13/233,578, filed Sep. 15, 2011, which is a continuation application of U.S. Ser. No. 12/897,243, filed on Oct. 4, 2010 (now U.S. Pat. No. 8,041,707), which is a continuation application of U.S. Ser. No. 11/490,172, filed Jul. 21, 2006 (now U.S. Pat. No. 7,827,167), the entire disclosures of which are incorporated herein by reference. This application claims priority to JP 2005-213090, filed Jul. 22, 2005.

BACKGROUND OF THE INVENTION

1. Field of the Invention

The present invention relates to database management technologies.

2. Description of the Related Art

U.S.20040117398 discloses a management server in a system which configures a database (DB) under a virtualization environment. The management server acquires DB processing information such as an execution plan and a processing priority of DB, from a database management system (DBMS), predicts data to be accessed and the order of accesses based on the information, instructs the reading of the data to be accessed in the near future on the cache of a storage device based on the prediction result, and reads the data to be accessed in the nearest future in the cache memory of its own server.

SUMMARY OF THE INVENTION

An object of the present invention is to shorten a time taken to execute one query more in detail a total data read wait time during execution of one query.

Other objects of the present invention will become apparent from the description given later.

According to one aspect of the present invention, there is provided a database management system comprising:

a query interface for receiving a query;

a query plan generator for generating a query plan from the received query; and a query executor for executing the received query in accordance with the generated query plan, wherein the query executor:

executes a database processing for a database in accordance with the query plan;

in the database processing, generates a new task each time each data is accessed, in accordance with a plurality set of data contained in the database, a task from which the new task originates processing data following the data accessed;

issues a data read request for reading data from the database in the generated new task, acquires the data from the database, and executes the database processing for the acquired data;

executes the database processing for each of a plurality of generated new tasks, and thereafter eliminates each of the new tasks; and executes in parallel at least two tasks of the plurality of generated new tasks.

The database management system may further comprise a read sequence controller or I/O optimizer for receiving a plurality of data read requests issued from the query executor, and issuing the plurality of received data read requests in a sequence based on block addresses corresponding to the plurality of received data read requests.

The query executor may suspend to generate a new task if the number of presently existing tasks reaches a predetermined number, and generate a new task if the number of presently existing tasks becomes smaller than the predetermined number.

The database management system may comprise an I/O optimizer having a plurality of queues having different priority degrees, wherein in executing the generated new task, the query executor distributes the plurality of data read requests to said queues corresponding to priority degrees corresponding to contents representative of emergency of I/O requests contained in the received query, and the read sequence controller issues data read requests stored in higher priority degree queues, taking priority over other data read request.

Upon reception of a predetermined command, the read sequence controller may move at least one read request stored in a queue having a certain priority degree to a queue having a different priority degree.

The query executor may decide the queue having what priority degree is used for storing the data read request in accordance with contents of the query plan or performance requirements for execution of the received query.

The database management system may comprise a task manager for calculating the number of left steps in accordance with the query plan and raising the priority degree of a task having a smaller calculated number of left steps, wherein the query executor stores the data read request issued by executing the task having the raised priority degree, in the queue corresponding to the raised priority degree.

In executing the generated new task, the query executor may suspend to acquire the data in the database, and after the date is acquired, resume execution of the task in a same sequence as a data acquisition suspend start sequence.

A specific example of the database management system is as follows. Namely, the database management system may comprise a query interface for receiving a query (e.g., SQL query) from an upper-level computer program (e.g., an application program), a query plan generator for generating a query plan based on the received query, the query plan being a plan for executing the received query, and a query executor for executing the query in accordance with the generated query plan. The query plan may be expressed in a tree structure having nodes for database operations and edges for their operation sequence. Data read may be made in an execution of an operation. The query executor may be constituted of a step of extracting an initial database operation independent from other database operations and assigning a task and a step of executing the assigned task.

A process of executing a task corresponding to the database operation includes the following steps (A) to (D):

(A) a step of generating a plurality of independent tasks for a data read process;

(B) a step of, in a data read process for the plurality of generated tasks, issuing a data read request to an operating system if it is necessary to read data from an external storage device;

(C) a step of resuming execution of the database operation in a task which has completed data read; and (D) a step of executing a next database operation, if any, relating to the executed database operation.

In a first example, the query executor suspends to generate a new task if the number of presently existing tasks in a predetermined state reaches a predetermined number, and generates a new task if the number of presently existing tasks becomes smaller than the predetermined number. The predetermined state for a task may be simply a state of a task presently existing or a state of a task waiting for fetching data.

In a second example, the database management system may comprise a read sequence controller for receiving a plurality of data read requests issued from the query executor, and issuing the plurality of received data read requests in a sequence different from the sequence of reception thereby to shorten a total data read time length (i.e., a time length required to read data corresponding to a plurality of data read requests).

Specifically, for example, the database management system may comprise a read or I/O optimizer for receiving data read requests from the query executor and issuing the data read requests to an operating system. The read optimizer has a queue of the received data read requests, and if the condition (e.g., a condition for starting a batch scheduling in the second embodiment to be described later) is satisfied, reorders the output sequence of the data read requests to thereby optimize the data read time.

In a third example, the database management system may further comprise an I/O optimizer having a plurality of queues of different priority degrees, wherein in executing the generated new task, the query executor distributes the plurality of data read requests to the queues of priority degrees corresponding to predetermined conditions. The read sequence controller, or an I/O optimizer issues data read requests stored in a higher-priority queue more preferentially.

Specifically, for example, the read optimizer, or an I/O optimizer may have a plurality of data read request queues for storing read requests and issue a data read request in accordance with the predetermined process sequence set to each read request queue. In this case, in executing a task and issuing a data read request to the read optimizer, the following processes (a) to (c) may be executed:

(a) a process of adding a scheduling flag to a data read request;

(b) a process of selecting one of a plurality of data read request queues in accordance with a value of the scheduling flag; and (c) a process of storing the data read request in the selected data read request queue.

In a fourth example, upon reception of a predetermined command in the third example, the read sequence controller moves at least one read request stored in a queue having a certain priority degree to a queue having a different priority degree.

Specifically, for example, if the database management system issues a schedule cancel command to a data read request queued in the data read request queue for scheduling, the data read request can be moved to the data read request queue for out-of-schedule.

In a fifth example, in the third example the query executor may decide the queue having what priority degree is used for storing the data read request in accordance with the query plan or performance requirements for execution of the received query.

In a sixth example, in the third example, the database management system may further comprise a task manager for calculating the number of left steps not yet executed in accordance with the query plan and raising the priority degree of a task having a smaller number of left steps, wherein the query executor puts the data read request issued by executing the task having the raised priority degree, into the queue corresponding to the raised priority degree. The number of left steps may be the number of left database operations.

In a seventh example, in executing the generated new task, the query executor suspends to acquire the data in the database, and after the date is acquired, resumes execution of the task in a same sequence as a sequence of data acquisition suspended. This may be applied to the second example.

According to another aspect of the present invention, a computer system comprises: the database management system described above; and a read sequence controller. The read sequence controller receives a plurality of data read requests issued from the database management system, and issues the plurality of received data read requests in a sequence different from a data read request reception sequence to thereby shorten a total data read time length.

BRIEF DESCRIPTION OF THE DRAWINGS

FIG. 3 illustrates an example of a flow of processes to be executed by a query executor 9.

FIG. 6 shows an example of a system configuration according to a second embodiment of the present invention.

FIG. 8 is an illustrative diagram of an I/O optimizer 27.

FIG. 14A shows an example of the structure of the data-acquisition suspend table according to the third embodiment of the present invention.

FIG. 14B illustrates a first different point from the process to be executed by a generated child task in the first embodiment.

FIG. 14C illustrates a second different point from the process to be executed by a generated child task in the first embodiment.

DESCRIPTION OF THE EMBODIMENTS

Figure 1A:
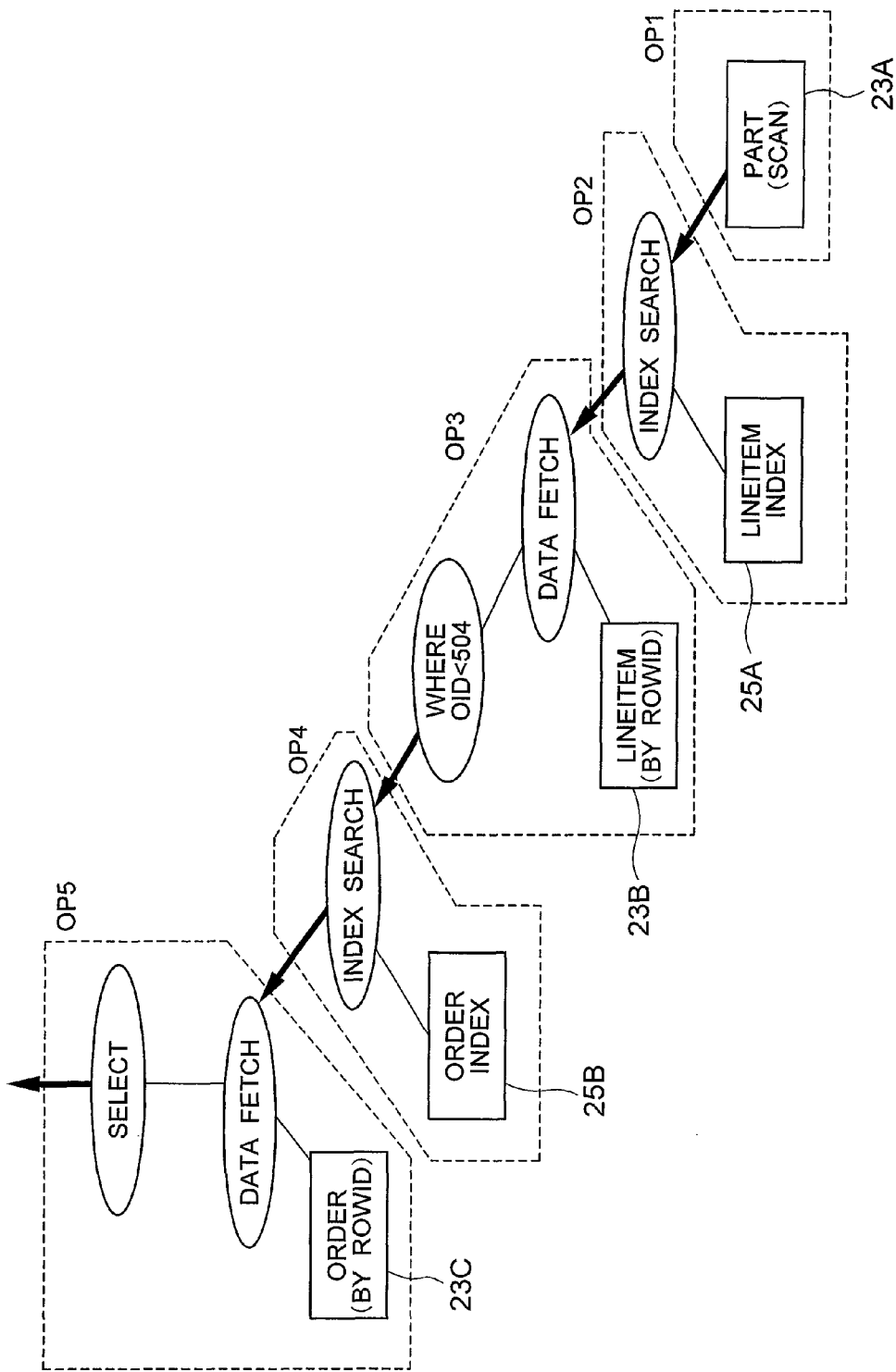
FIG. 1A shows an example of a query plan.

A database management system (DBMS) receives a query, executes the query and outputs an execution result. Database operations are executed in some cases at a plurality of stages until the query execution result is output. A plurality of database operations are generally performed in a predetermined order, and at least one of the database operations may be required to issue a read request to a storage device. One specific example will be described with reference to FIGS. 1A to 1C.

It is assumed, for example, that DBMS receives a query from an upper level computer program (e.g., application program) and generates a query plan shown in FIG. 1A as an execution plan of the query (hereinafter, simply called a "query plan"). It is also assumed that a PART table 23A, a LINEITEM table 23B, an ORDER table 23C and various indices 25A and 25B are stored in a storage device (e.g., an external storage device connected to a database server having DBMS).

According to the query plan illustratively shown in FIG. 1A, database operations (hereinafter abbreviated to "OP") 1 to 5 are repeated until all rows of the PART table 23A are read. OP1 is an initial database operation of reading one row from the PART table 23A (refer to FIG. 1B). OP2 is an operation of searching a pointer (rowid) of the LINEITEM table (refer to FIG. 1B) corresponding to PID in the read row, by using a LINEITEM index 25A. OP3 is an operation of fetching a row from the LINEITEM table 23B by using the obtained pointer and performing filtering by using OID (e.g., an operation of outputting only rows having OID smaller than 504). OP4 is an operation of searching a pointer (rowid) of the ORDER table 23C (refer to FIG. 1B) corresponding to the OID, by using the ORDER index 25B. OP5 is an operation of fetching a row of the ORDER table 23C by using the obtained pointer to thereafter return. By repeating OP1 to OP5 described above, it becomes possible to return the query execution results illustratively shown in FIG. 1C to the computer program which is a query issue source.

In executing one query, a plurality of OPes are repetitively executed, and in each execution cycle, after one OP is completed, the next OP starts. Therefore, for example, if a read request is issued by some OP (e.g., OP3), the succeeding operation has to wait until data is read in response to the read request. It is desired to totally shorten the time for inputs and outputs.

Furthermore, while one query is executed, the storage device is randomly accessed in some cases. Specifically in the above OP1 to OP5, the LINEITEM table 23B, ORDER table 23C and indices are read randomly in some cases. More specifically, for example, after the first row of the LINEITEM table 23B is accessed, the twelfth row is accessed and then the sixth and ninth rows are accessed, although the sixth and ninth rows correspond also to the rows of the PART table 23A. In the above-described random access to be performed if DBMS issues a read request a plurality of times during execution of one query, it is desired to shorten a total data read wait time.

[First Embodiment]

Figure 2:
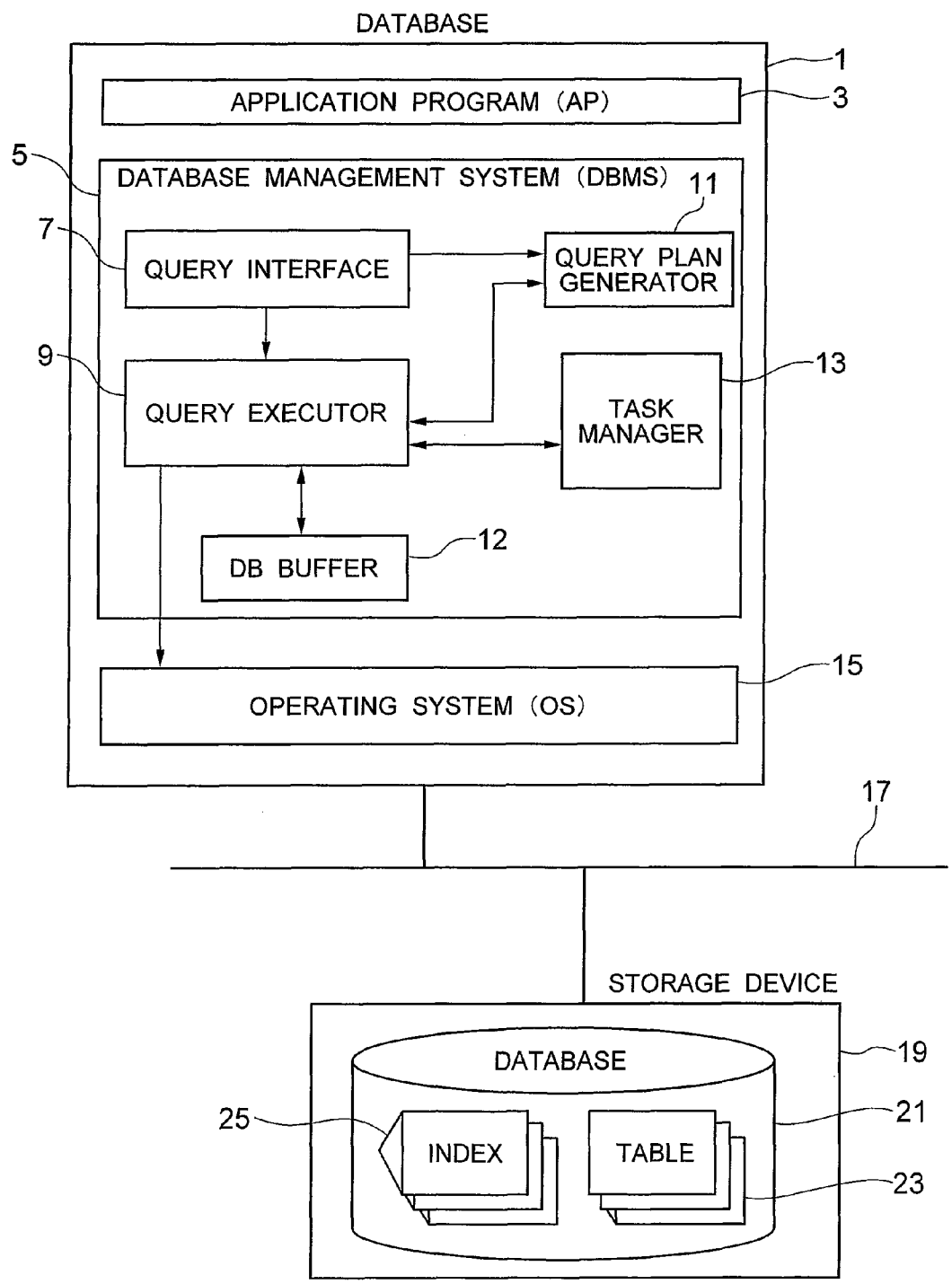
FIG. 2 shows an example of a system configuration according to a first embodiment of the present invention.

FIG. 2 shows an example of the configuration of a system according to the first embodiment of the present invention.

A database server 1 and an external storage device 19 are connected via a communication network 17 to establish communications therebetween.

The external storage device 19 having storage resources may be any device. For example, the external storage device 19 may be a file server, a single disk drive (e.g., a hard disk drive), or a storage system having a plurality of disk drives. The external storage device 19 has a database 21 capable of storing a plurality of electronic indices 25 and a plurality of electronic tables 23. Each index 25 is data (e.g., indices 25A and 25B shown in FIG. 1B) including a plurality of pointers indicating a link between each row of one table and each row of another table, and for example, adapted in a B-tree index. Each table 23 is data (e.g., PART table 23A, LINEITEM table 23B and ORDER table 23C shown in FIG. 1B) including a plurality of rows each constituted of a plurality of row elements.

The database server 1 is a computer having, although not specifically shown, a storage resource (e.g., memory, hard disk) capable of storing a plurality of computer programs, a processor (e.g., CPU) capable of reading the computer program from the storage resource and executing the program, and the like. For example, the computer programs include: an application program (hereinafter abbreviated to AP) 3 for issuing a query (e.g., a Structured Query Language (SQL) query); a database management system (hereinafter abbreviated to DBMS) 5 for receiving a query from AP 3, executing the query and returning the execution results to AP3; and an operating system (hereinafter abbreviated to OS) 15 such as Windows (registered trademark). DBMS 5 is at a level higher than OS 15, and AP 3 is at a level higher than DBMS 5. AP may be at a computer different from a computer at which DBMS runs. In this case, a query request from AP is received via the network. It will be possible that, a database buffer (hereinafter abbreviated to DB buffer) 12 to be used by DBMS 5 can be configured by using a portion of the storage resource.

Figures 1B, 1C:
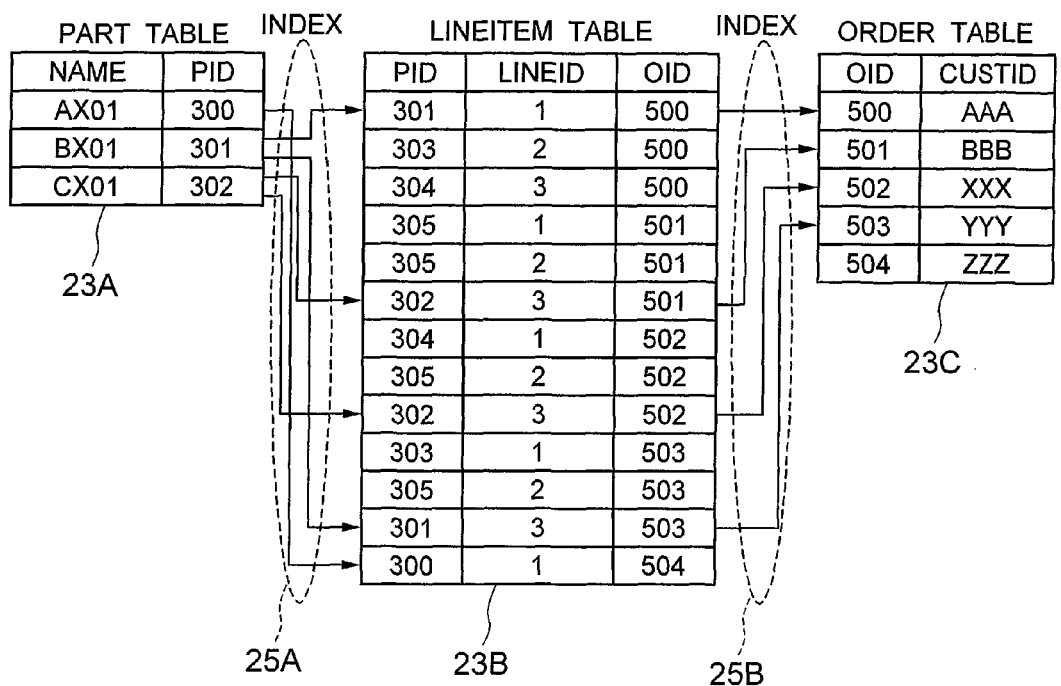
FIG. 1B shows examples of the structures of a PART table, a LINEITEM table and an ORDER table, and a relation among these tables.
FIG. 1C shows an example of information output as a query result.

For example, DBMS 5 is constituted of: a query interface 7 for receiving a query from AP 3; a query plan generator 11 for generating a query plan such as illustratively shown in FIG. 1A in accordance with the query received by the query interface 7; a query executor 9 for executing the query in accordance with the generated query plan; and a task manager 13 for managing tasks for executing the query (e.g., for assigning a task with resources such as CPU and memory). The query plan defines an execution sequence of a plurality of database operations (OPes).

The first embodiment is characterized particularly by the processings to be executed by the query executor 9. The query executor 9 executes a task assigned with at least one OP to thereby execute at least one OP. If it becomes necessary to read data from the external storage device 19 during task execution, the query executor 9 generates a task for reading this data and executing the next OP, and executes the generated task, so that an input/output request (hereinafter abbreviated to "I/O request") can be issued. If a plurality of tasks are generated, a plurality of tasks can be executed in parallel, so that a plurality of I/O requests can be issued in parallel. For task implementation, arbitrary execution environments can be utilized such as processes and threads managed by OS, pseudo processes and pseudo threads implemented by applications and middleware.

In the following, description will be made on the processes to be executed by the query executor 9. In order to help understood the description easily, it is assumed that one OP is executed by executing one task. However, obviously the embodiment is not limited thereto. For example, a plurality of OPes may be executed by executing one task. Specifically, for example, one task may execute one OP and execute the next OP by inheriting the execution results of one OP.

FIG. 3 shows an example of the flow of the processes to be executed by the query executor 9.

The query executor 9 executes a task (hereinafter called "parent task", for the purpose of conveniences) assigned a database operation (OP) at some stage to execute an OP.

During OP execution, the executed parent task executes, if there is left data (e.g., data still not read from the index 25 or table 23) (if "DATA PRESENT" in Step S1), a task-generation suspend process (S2). If the task-generation suspend process permits generation of a task, the parent task generates a task 31 that is to read the left data (hereinafter called "child task", for the purpose of conveniences) for execution of the next OP (S3). During execution of the parent task ("PARENT TASK" at S4), S1 is executed again. If "NO DATA" at S1, the parent task can be eliminated.

The query executor 9 can execute the generated child tasks 31 in parallel. If a plurality of child tasks each of which executes the same OP but processes different data are generated while the processes of the "parent task" at S1 to S4 are repeated, the plurality of generated child tasks 31 can be executed in parallel.

The executed child task 31 executes a data acquisition process of acquiring left data at S1, and if the data can be acquired ("DATA PRESENT" at S11), executes the process at S12 for judging whether the acquired data matches a selection condition (S12 is not executed depending upon the type of OP). If the acquired data matches the selection condition ("PRESENT" at S12), the child task 31 executes, if there is a next OP present to be executed by the child task, the next OP (S14), whereas if not ("NONE" at S13), the child task returns the execution results (S15).

Whether there is the next OP or not can be judged, for example, by referring to the query plan illustratively shown in FIG. 1A generated by the query generator 11. During execution of the next OP at S14, the child task can generate, after executing the S1, a new child task at S3.

Figure 4A:
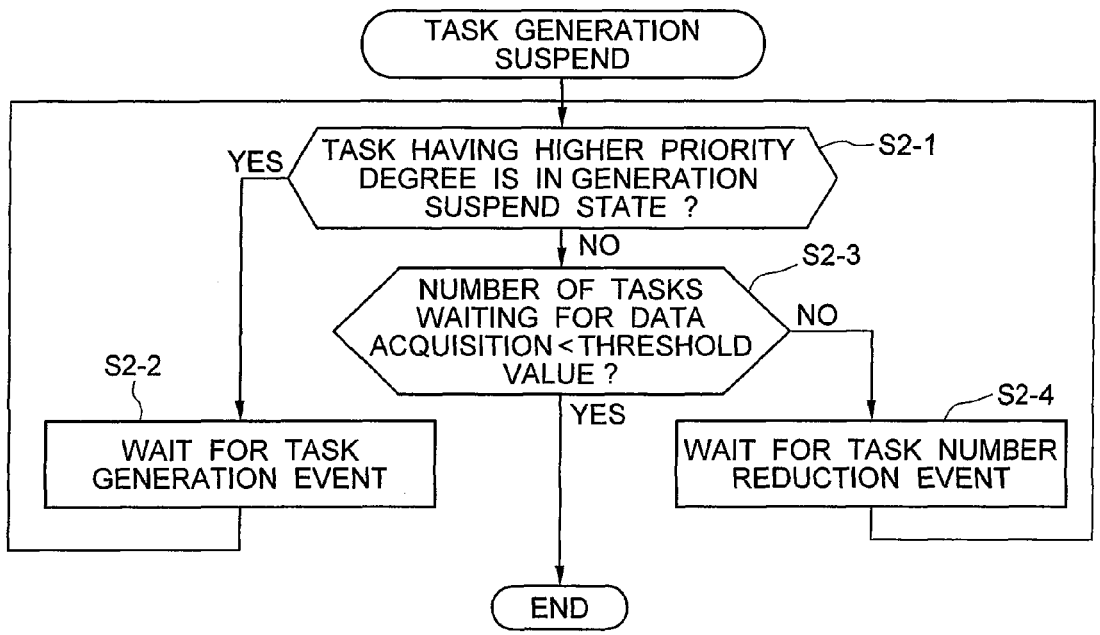
FIG. 4A illustrates an example of a flow of a task-generation suspend process at S2 shown in FIG. 3.

FIG. 4A shows an example of the flow of the processes to be executed by the task generation suspend process at S2 shown in FIG. 3.

The parent task judges whether generation of a task having a priority degree higher than its own is suspended (S2-1) by referring to the query plan.

If the judgement result at S2-1 indicates a suspend state ("YES" at S2-1), the parent task waits for a task generation event (S2-2).

If the judgement result at S2-1 does not indicate a suspend state ("NO" at S2-1), the parent task judges whether the number of presently existing tasks waiting for data acquisition is smaller than a threshold value (S2-3). The number of presently existing tasks waiting for data acquisition can be judged, for example, in the following manner. The query executor 9 increments a predetermined count value by 1 each time a task is generated and decrements the count value by 1 each time data acquisition is completed. The parent task is able to obtain the present count value. The threshold value is, for example, a kind of a tuning parameter whose value can be set by a manager of DBMS 5 as desired, or may be set arbitrarily according to a query or a DBMS or user preference.

If the judgement result at S2-3 indicates that the number of presently existing tasks is smaller than the predetermined threshold value ("YES" at S2-3), the task generation suspend process at S2 shown in FIG. 3 is terminated and the next Step S3 can be executed, whereas if not ("NO" at S2-3), the parent task waits for an event of at least one task elimination (S2-4). This event may be "NO DATA" at S1 in FIG. 3.

Figure 4B:
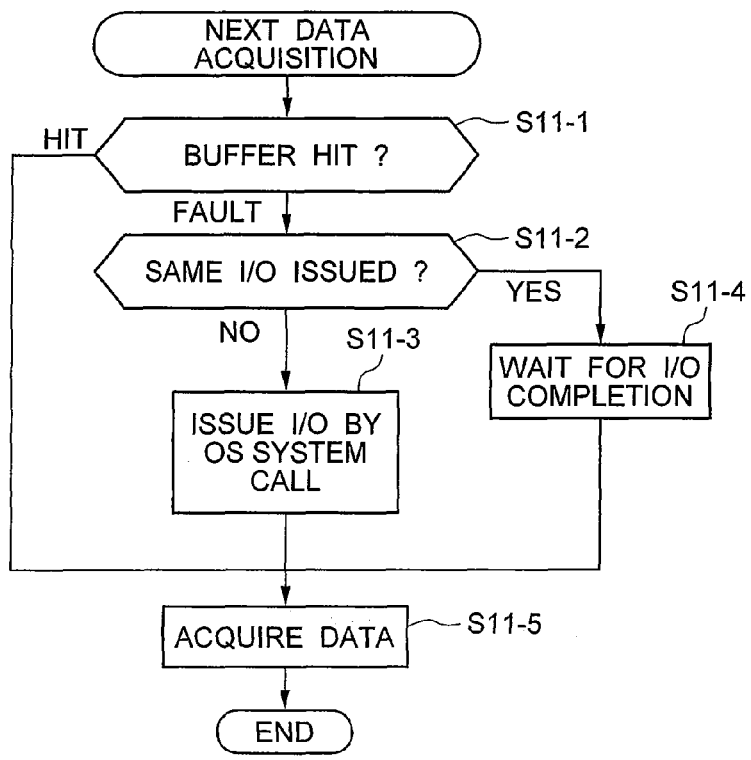
FIG. 4B illustrates an example of a flow of a data acquisition process at S11 shown in FIG. 3.

FIG. 4B shows an example of the flow of the processes to be executed by the data acquisition process at S11 shown in FIG. 3.

The child task accesses the DB buffer 12. If there is data left in the DB buffer 12 ("HIT" at S11-1), the data is acquired from the DB buffer 12 (S11-5) to thereafter terminate the data acquisition process. If there is no data left in the DB buffer 12 ("FAULT" at S11-1) and if an I/O request is not still issued for the data ("NO" at S11-2), an I/O request is issued by using an OS system call (S11-3). Namely, the child task issues an I/O request to OS 15 to make OS 15 issue an I/O request to the external storage device 19. In response to this, execution by the child task suspends until data is read from the external storage device via OS 15. After the data is read (S11-5), the child task resumes the process to store the read data in the DB buffer 12 and thereafter terminate the data acquisition process.

If "FAULT" at S11-1 and an I/O request is already issued for the data ("YES" at S11-2), the child task waits for I/O request completion (S11-4). After the data is read (S11-5), the child task restarts the process to store the read data in the DB buffer 12 and thereafter terminate the data acquisition process. Whether an I/O request is already issued for data can be judged, for example, in the following manner. Each time each task issues an I/O request to OS 15, I/O destination information representative of an access destination of the I/O request is written in a predetermined storage area of the storage resource of the database server 1, and the child task refers to the I/O destination information in the predetermined storage area. For example, the I/O destination information may contain an identifier (e.g., logical unit number) of a logical unit provided in the external storage device 19 and a block address (hereinafter abbreviated to BA) of an access destination. The storage resource of the database server 1 may store, for example, mapping information representative of a correspondence between a DB object (e.g., table 23 and index 25 or each row element (e.g., PID, OID) of table 23 and index 25) and storage information (e.g., logical unit identifier and/or BA), and each task issues an I/O request to OS 15 or writes the I/O destination information in the predetermined storage area, in accordance with the mapping information.

Figure 5B:
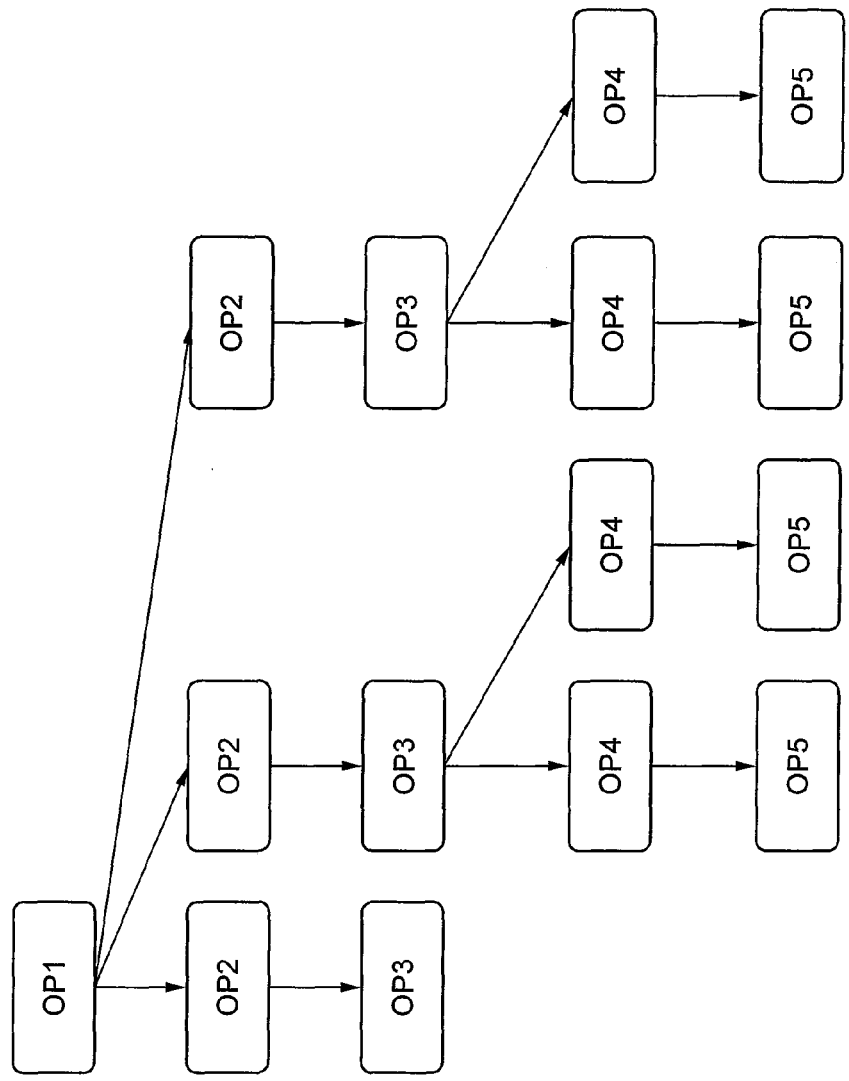
FIG. 5B illustrates an example of a flow of query plan according to the first embodiment of the present invention.
Figure 5A:
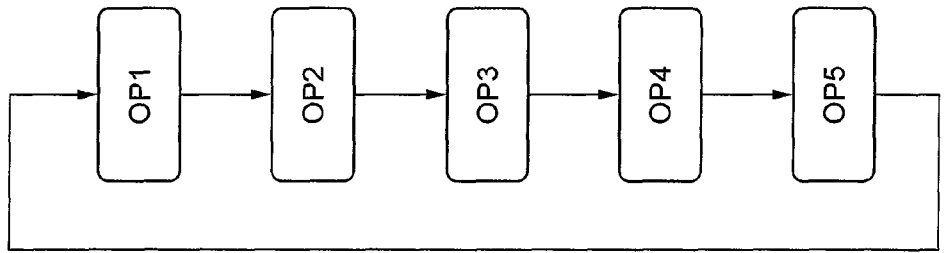
FIG. 5A illustrates an example of a flow of conventional query plan.

According to the first embodiment described above, if it becomes necessary during task execution to read data from the external storage device 19, the query executor 9 generates a task for reading the data and executing the next OP, and executes the generated task, so that an I/O request can be issued. If a plurality of tasks are generated, a plurality of tasks can be executed in parallel, so that a plurality of I/O requests can be issued in parallel. This will be described by taking as an example the case wherein a query is executed in accordance with the query plan illustratively shown in FIG. 1A. According to conventional technologies, as shown in FIG. 5A, OP1 to OP5 are required to be repetitively and sequentially executed until all rows in the PART table 23A are read. According to the first embodiment, as shown in FIG. 5B, OPes at the same stage can be executed in parallel. Specifically, since the number of rows of the PART table 23A is three, a plurality of child tasks are generated by executing the task assigned OP1, and three OP2s corresponding to three rows of the PART table 23A can be executed in parallel by executing the plurality of child tasks in parallel. After OP2s are executed, OP3s are also executed in parallel. Depending upon the execution results, a task is eliminated and OP4 and following OPes are not executed (e.g., task elimination because the selection condition at S12 shown in FIG. 3 is not satisfied; specifically, a fetched OID is not smaller than 504), or a plurality of OS4s are executed after execution of one OP3 (e.g., two OP4s corresponding to two fetched rows corresponding to PID "301"). Since OPes requiring to issue an I/O request are executed in parallel, a plurality of I/O requests are issued in parallel. Therefore, for example, if each generated task issues a read request, then execution of the task is suspended until data is read in response to the read request. Even in this case, other generated tasks are executed independently, and execution of the query itself will not be blocked. Accordingly, a time taken to execute one query can be shortened more than a conventional example.

Further, according to the first embodiment, tasks will not be generated limitlessly, and a new task is not generated when the number of presently existing tasks in a data acquisition suspend state becomes equal to or more than the predetermined value. When the number of presently existing tasks in a data acquisition suspend state takes a value smaller than the predetermined value, a new task is generated. It is therefore possible to control the amount of computer resources (e.g., CPU usage factor, memory use amount, etc.) to be consumed by the processes of DBMS 5.

[Second Embodiment]

The second embodiment of the invention will be described. Different points from the first embodiment will be described mainly. The description of common points to the first embodiment will be simplified or omitted in order to omit duplicated description.

FIG. 6 shows an example of the configuration of a system according to the second embodiment of the invention. In FIG. 6, like elements to those of the first embodiment are represented by identical reference numerals.

In the second embodiment, DBMS 5 is provided with an I/O optimizer 27. In this case, the query executor 9 issues an I/O request not to OS 15 but to the I/O optimizer 27. The I/O optimizer 27 can receive and hold a plurality of I/O requests issued in parallel from the query executor 9, reorder the sequence of received I/O requests decreasing a data read time length, and issue the plurality of I/O requests to OS 15 in the reordered sequence.

In the following, the second embodiment will be described in detail.

Figure 7A:
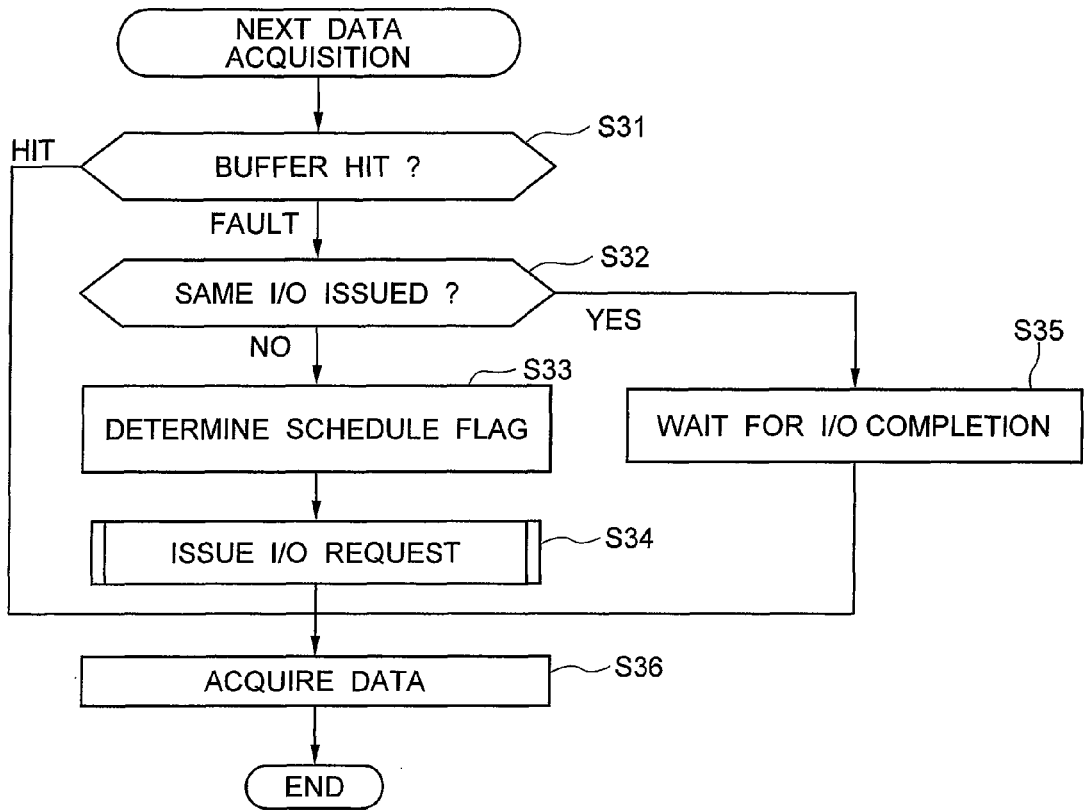
FIG. 7A illustrates an example of a flow of a data acquisition process according to the second embodiment of the present invention.

FIG. 7A shows an example of the flow of a data acquisition process according to the second embodiment of the invention.

In FIG. 7A, S31, S32, S35 and S36 correspond to S11-1, S11-2, S11-4 and S11-5 shown in FIG. 4A. Different points reside in S33 and S34.

At S33, a child task under execution by the query executor 9 judges whether an I/O request to be issued is to be scheduled. If the I/O request is to be scheduled, it is determined to add a schedule flag. For example, an I/O request to be scheduled has low emergency of issuing the I/O request to OS 15, and an I/O request is not scheduled if it has high emergency. Whether an I/O request is to be scheduled can be determined, for example, depending upon the contents of a query plan or the performance requirements of query execution. In a former specific example, the child task refers to the query plan, and if OP assigned to the child task has a priority degree higher than OP of a certain stage, the child task may determine that the I/O request is not scheduled, whereas if not, the child task may determine that the I/O request is scheduled. In a latter specific example, if an I/O request for accessing a database having the access characteristic of low urgency such as a decision making support system is to be issued, the child task may determine that the I/O request is scheduled, whereas if not, the child task may determine that the I/O request is not scheduled.

After S33, the child task executes the I/O request issue process (S34).

Figure 7B:
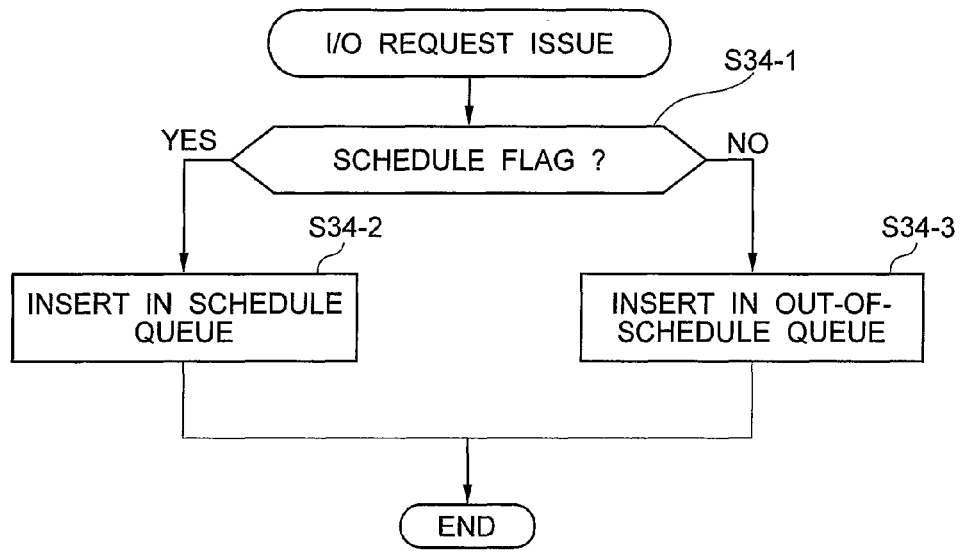
FIG. 7B illustrates an example of a flow of an I/O request issue process.

FIG. 7B shows an example of the flow of the I/O request issue process.

If a schedule flag is added ("YES" at S34-1), the child task inserts an I/O request in a schedule queue (S34-2), whereas if a schedule flag is not added ("NO" at S34-1), the child task inserts an I/O request in an out-of-schedule queue (S34-3), The I/O optimizer 27 has the schedule and out-of-schedule queues.

FIG. 8 is an illustrative diagram showing operations by the I/O optimizer 27.

The I/O optimizer 27 has the out-of-schedule queue 61A and the schedule queue 61B. A priority degree (in other words, an emergency degree of issuing an I/O request) of the out-of-schedule queue 61A is higher than that of the schedule queue 61B. The query executor 9 stores I/O requests 63 not to be scheduled, into the out-of-schedule queue 61A, and stores I/O requests 63 to be scheduled, into the schedule queue 61B.

With reference to FIGS. 9A and 9B and FIGS. 10A and 10B, a flow of the processes to be executed by the I/O optimizer 27 will be described. Reference is made also to FIG. 8 when necessary.

Figure 9A:
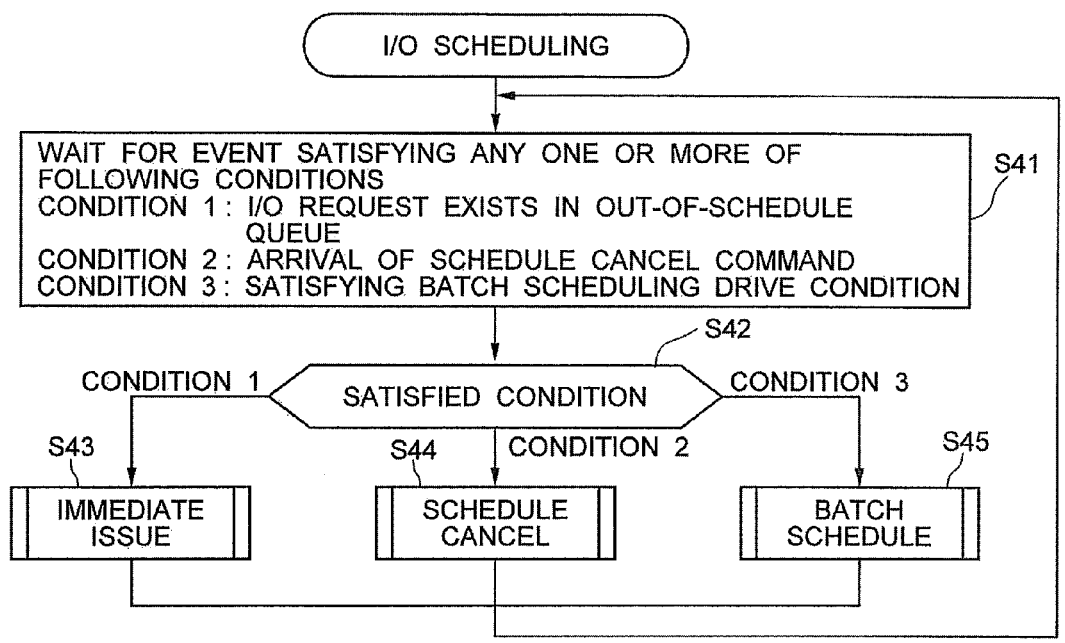
FIG. 9A illustrates an example of a flow of a process to be executed by the I/O optimizer 27.

FIG. 9A shows an example of the flow of the processes to be executed by the I/O optimizer 27.

The I/O optimizer 27 waits for an event matching at least one condition among three conditions 1 to 3 (S41). The condition 1 corresponds to an event that an I/O request is stored in the out-of-schedule queue 61A. The condition 2 corresponds to an event of an arrival of a schedule cancel command. The condition 3 corresponds to an event that a batch schedule driving condition to be described later is satisfied.

When an event satisfying at least one of the conditions 1 to 3 occurs, the I/O optimizer 27 judges the condition which matches the occurred event (S42); if it is judged that the event matches the condition 1, an immediate issue process is executed (S43), if it is judged that the event matches the condition 2, a schedule cancel process is executed (S44), and if it is judged that the event matches the condition 3, a batch schedule process is executed (S45). If an event matches a plurality of conditions, for example, the I/O optimizer 27 can give preference to a process of higher priority degree, in execution of the processes. For example, if the condition 1 has a higher priority than that of the condition 3 and an event matching both the conditions 1 and 3 occurs, the I/O optimizer 27 can execute the immediate issue process corresponding to the condition 1 prior to the batch schedule process corresponding to the condition 3.

Figure 9B:
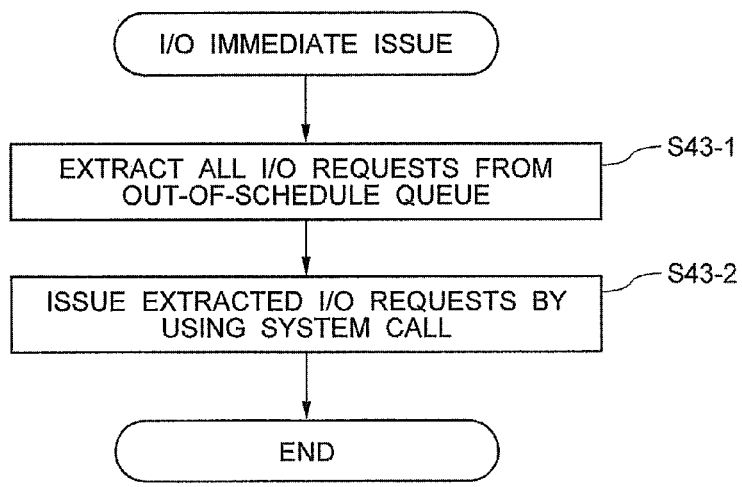
FIG. 9B illustrates an example of a flow of an immediate issue process.

FIG. 9B shows an example of a flow of the immediate issue process.

The I/O optimizer 27 extracts all I/O requests from the out-of-schedule queue 61A (S43-1), and issues the extracted I/O requests by using the system call of OS 15. In this manner, the I/O requests are issued to the external storage device 19. The immediate issue process is executed each time the I/O optimizer 27 detects that an I/O request is stored in the out-of-schedule queue 61A, decreasing the time of an I/O request in the out-of-schedule queue rather than the time required for a batch schedule process to be described later.

Figure 10A:
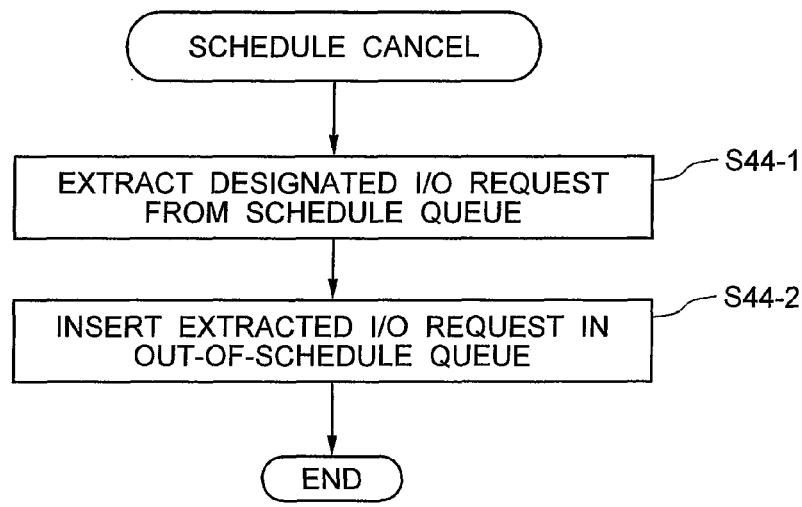
FIG. 10A illustrates an example of a flow of a schedule cancel process.

FIG. 10A shows an example of the flow of the schedule cancel process.

As shown in FIG. 8 by an arrow with a dotted line stick, the I/O optimizer 27 acquires an I/O request designated by the schedule cancel command from the schedule queue 61B (S44-1), and inserts the acquired I/O request 63 in the out-ofschedule queue 61A (S44-2). The insertion position may be any position. For example, the position may be the last position of one or more I/O requests in the out-of-schedule queue 61A, the start position, or an intermediate position therebetween.

Figure 10B:
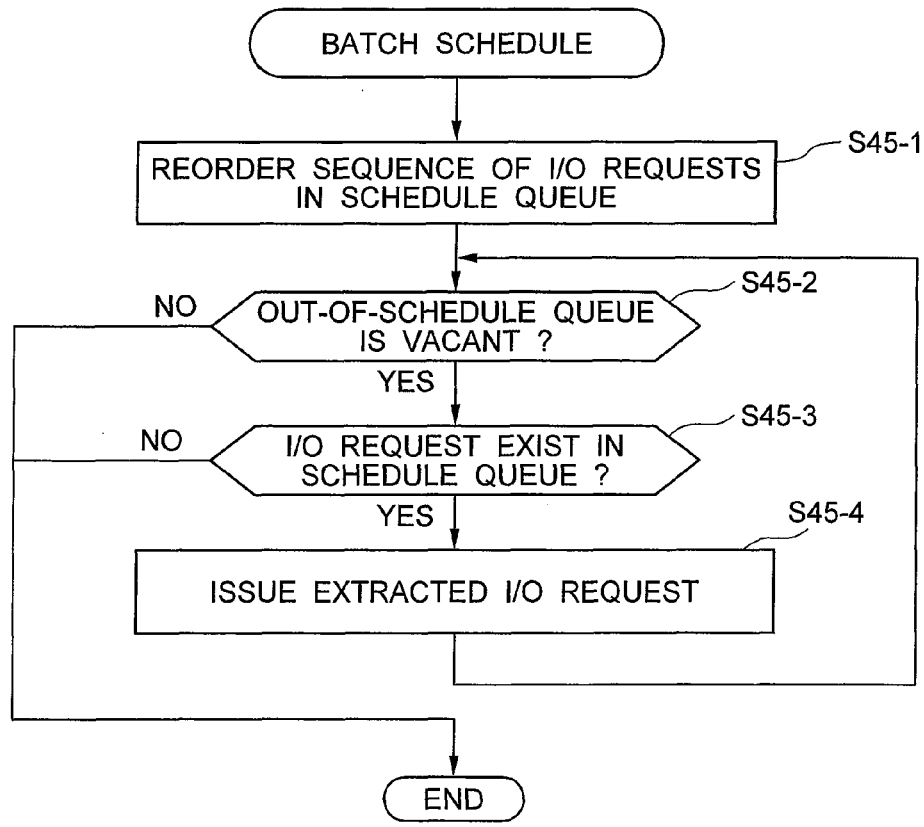
FIG. 10B illustrates an example of a flow of a batch schedule process.

FIG. 10B shows an example of the flow of the batch schedule process.

As described above, the batch schedule process starts when the batch scheduling drive condition is satisfied. The batch schedule drive condition may adopt, for example, a lapse of a predetermined time after the preceding batch schedule process was executed, or a usage factor of the schedule queue 61B being equal to or larger than a predetermined value.

The I/O optimizer 27 reorders the sequence of a plurality of I/O requests stored in the schedule queue 61B to the sequence shortening or optimizing a total data read time length of these I/O requests (S45-1). This sequence reorder may be performed by using the above-described mapping information. Specifically, for example, the I/O optimizer 27 identifies an access destination BA for each I/O request, and the sequence of I/O requests is reordered to minimize the disk seek time length of the external storage device 19. I/O requests to be reordered may be the I/O requests existing in the schedule queue 61B at the time when the batch schedule process starts. In this case, even if an I/O request is entered in the schedule queue 61B after the batch schedule process starts, this I/O request is not reordered in the current batch schedule process, and is reordered in the succeeding batch schedule process.

The I/O optimizer 27 judges whether the out-of-schedule queue 61A is vacant (S45-2), and if vacant (YES at S45-2), judges whether there exists an I/O request in the schedule queue 61B, and if exists (YES at S45-3), extracts the I/O request from the schedule queue 61B and issues the extracted I/O request to OS 15. If it is judged at S45-2 that the out-of-schedule queue 61A is not vacant (NO at S45-2), the I/O optimizer 27 terminates the batch schedule process and executes the immediate issue process S43 via S41 and S42 shown in FIG. 9A, in order to extract an I/O request in the out-of-schedule queue 61A at higher priority.

The second embodiment has been described above. According to the second embodiment, a plurality of I/O requests issued from the query executor 9 are not transmitted to the external storage device 19 in the sequence in which I/O requests are issued from the query executor 9, but are stored at the I/O optimizer 27 temporally and the sequence of stored I/O requests is optimized by the I/O optimizer 27 and then output. It is therefore possible to shorten a total read time length from when a plurality of I/O requests are issued from the query executor 9 to when data is read by the query executor 9. The advantages expected by the second embodiment will be described by comparing the advantages with those expected by the first embodiment. The following description is intended to help understand deeply the first and second embodiments. Even if the following expected advantages cannot be obtained, this does not mean that the embodiments are out of the technical scope of the present invention. For example, in disk seeks shown in FIGS. 11B, 12B and 13B, a time length represented by a unit distance along the abscissa is not necessarily the same.

Figure 11A:
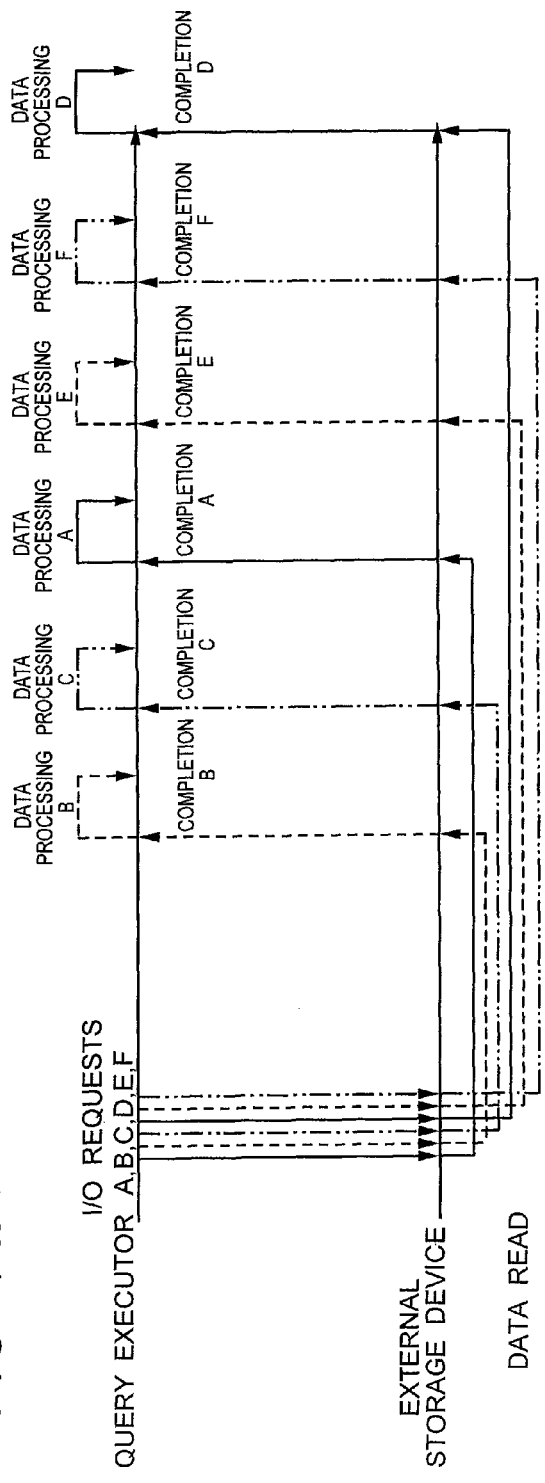
FIGS. 11A and 11B illustrate an example of the advantages expected by DBMS 5 of the first embodiment, an example of a flow of I/O request issue and data read according to the first embodiment, and an example of disk seeks in the flow shown in FIG. 11A.
Figure 11B:
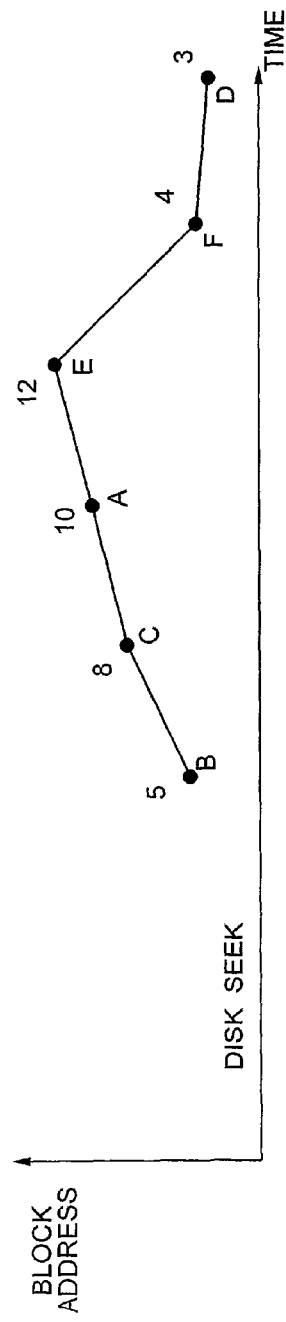

For example, in the first embodiment, it is assumed as shown in FIG. 11A that the query executor 9 issues six I/O requests A to F. Since the I/O optimizer 27 does not exist in the first embodiment, the sequence of the I/O requests A to F to be issued to OS 15 is not reordered by DBMS 5. In this case, for example, the I/O requests are reordered in some cases by utilizing the kernel of OS 15 or the function of the external storage device. For example, the I/O requests A to F are grouped into a group of the I/O requests A to C and a group of the I/O requests D to F. Reordering is performed not for all the I/O requests but for each group. For example, this is because OS 15 or the external storage device 19 cannot know the number of I/O requests to be issued. Unless a predetermined number of I/O requests are reordered or I/O requests accumulated in a predetermined time are reordered, the upper-level apparatus or computer program is required to stand by for a long time. In the example shown in FIG. 11A, at the stage when OS 15 or the external storage device 19 receives the I/O requests A to C, data is read by reordering the sequence "A→B→C" to the sequence "B→C→A". Next, at the stage when OS 15 or the external storage device 19 receives the I/O requests D to F, data is read by reordering the sequence "D→E→F" to the sequence "E→F→D". Therefore, as illustratively shown in FIG. 11B, it is possible to shorten the disk seek time length required for reading data corresponding to the I/O requests A to F, to some extent (however, as described earlier, since I/O requests are issued in parallel, the disk seek time length can be shortened more than conventional technologies).

Figure 12A:
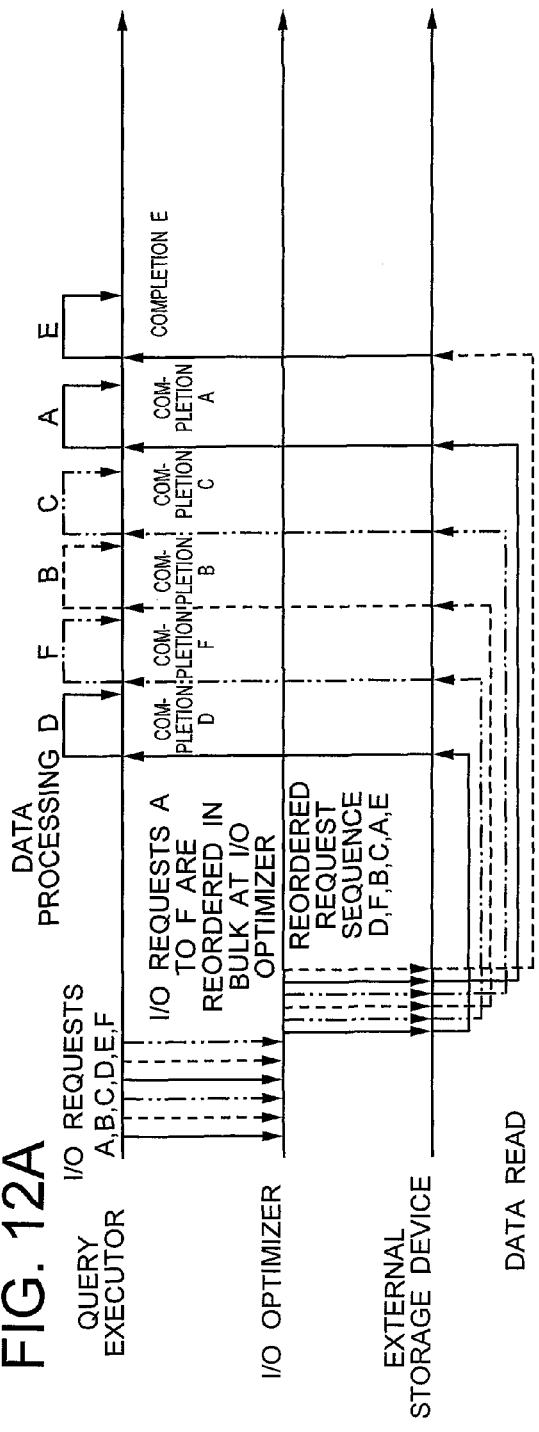
FIGS. 12A and 12B illustrate an example of the advantages expected by DBMS 5 of the second embodiment when an immediate issue process is not executed.
Figure 12B:
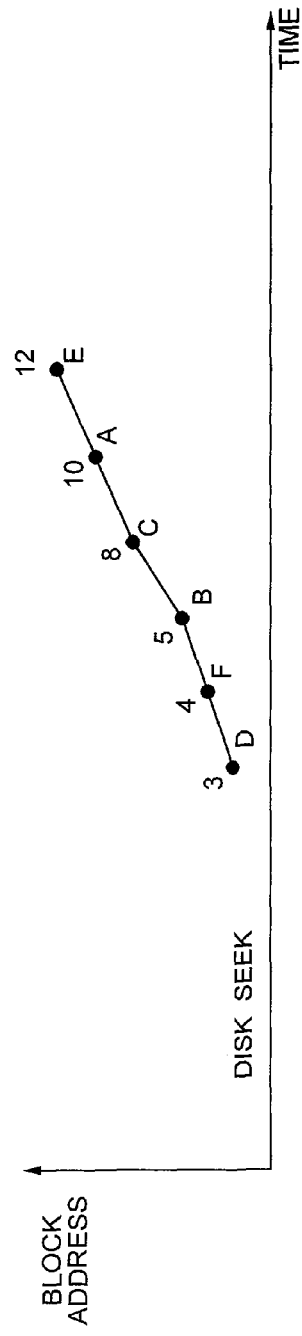

In contrast, in the second embodiment, as illustrated in FIG. 12A, the sequence of a plurality of I/O requests A to F to be issued to OS 15 is optimized at DBMS 5, and the I/O requests are issued to the external storage device 19 via OS 15 in the reordered sequence. As illustratively shown in FIG. 12B, therefore, it is possible to shorten the disk seek time length required for reading data corresponding to the I/O requests A to F more than the first embodiment. In the second embodiment, to reorder the sequence of I/O requests by OS 15 or the external storage device 19 as in the first embodiment will result highly in the same sequence as that reordered by the I/O optimizer 27, so that the advantages illustrated in FIGS. 12A and 12B can be expected.

Figure 13A:
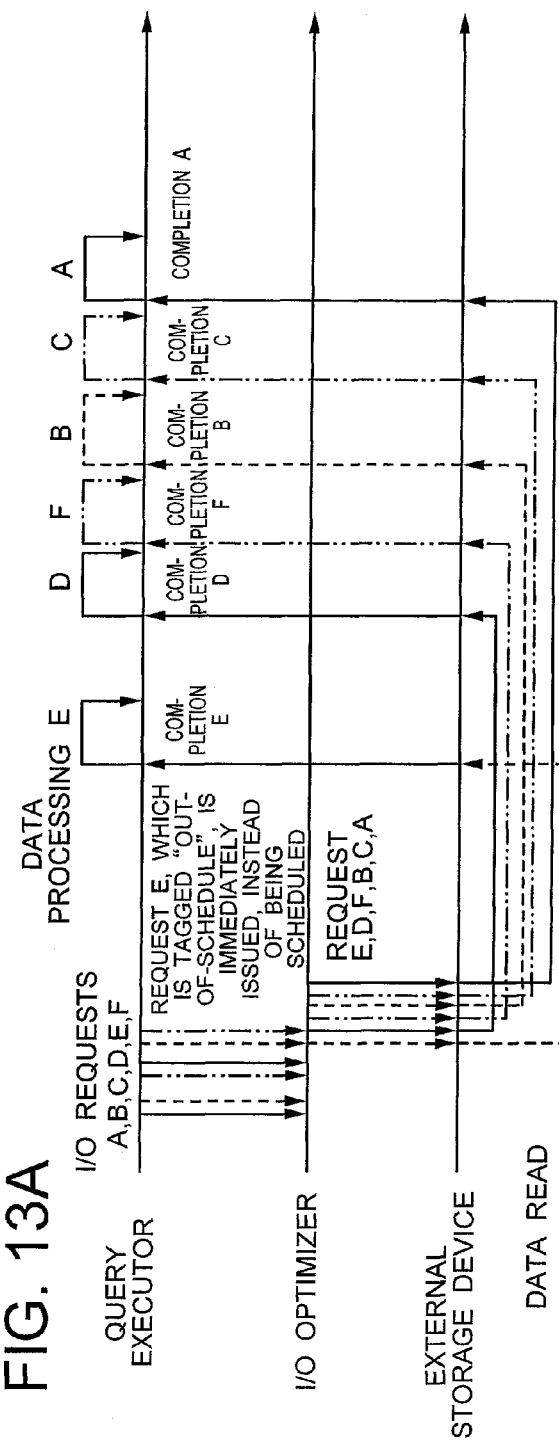
FIGS. 13A and 13B illustrate an example of the advantages expected by DBMS 5 of the second embodiment when the immediate issue process is executed.
Figure 13B:
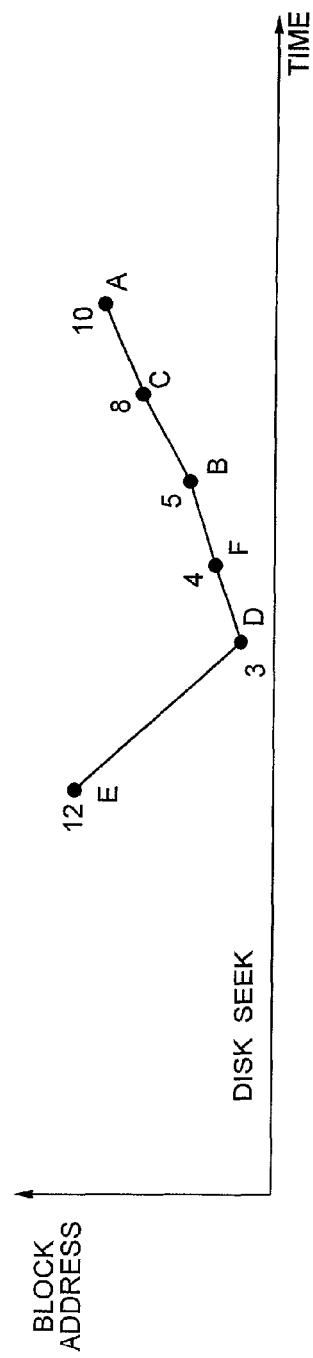

Further, in the second embodiment, for example, if the batch schedule process optimizes the issue sequence of I/O requests, and thereafter if out-of-schedule I/O requests are issued from DBMS 5, at higher priority, then the disk seek time length for reading data corresponding to the I/O requests A to F may become longer than that of the case of no immediate issue. However, even in this case, it is possible to shorten the disk seek time length required for reading data corresponding to the I/O requests A to F more than at least conventional technologies. In FIGS. 13A and 13B, if the I/O request E is determined to be issued immediately, the I/O optimizer 27 may reorder again the sequence of remaining I/O requests A to D and F.

[Third Embodiment]

The third embodiment of the present invention will be described in the following.

In the third embodiment, the query executor 9 resumes execution of tasks in the data acquisition process start order, although in the first (second) embodiment, the task execution resumes in the data read completion order. As a method of controlling the task execution resume order, a data acquisition suspend table may be used.

FIG. 14A shows an example of the structure of the data acquisition suspend table according to the third embodiment of the present invention.

The data acquisition suspend table 71 is information to be stored in the storage resource of the database server 1. The data acquisition suspend table 71 is constituted of a plurality of suspend information pieces 71R. The suspend information 71R is constituted of a data-acquisition order number and a task ID. The data acquisition order number is the number representative of an order of a data-acquisition process start. The task ID is an ID of the task that has recorded the suspend information piece.

FIG. 14B illustrates a first different point from the process to be executed by a generated child task in the first embodiment.

Prior to executing the data acquisition process, a generated child task inserts own wait information into the data acquisition suspend table 71 (S61). Specifically, the child task inserts, as the own suspend information, the data acquisition order number representative of the order of starting the data acquisition process at S11 shown in FIG. 3 and own task ID, into the data acquisition suspend table 71.

FIG. 14C illustrates a second different point from the process to be executed by a generated child task in the first embodiment.

After data is acquired by the data acquisition process, the child task searches the data acquisition suspend table, and deletes the own suspend information 71R inserted by the child task at S61 after the child task becomes the oldest suspend task (S62). Whether the child task becomes the oldest suspend task can be identified by judging whether the data acquisition order number in the suspend information 71R inserted by the child task is youngest among the data acquisition order numbers written in the data acquisition suspend table 71. Alternatively, for example, if the data acquisition suspend table 71R is a queue, it may be judged that the child task is the oldest suspend task, when the suspend information written by the child task is at the start address of the queue.

Figure 15A:
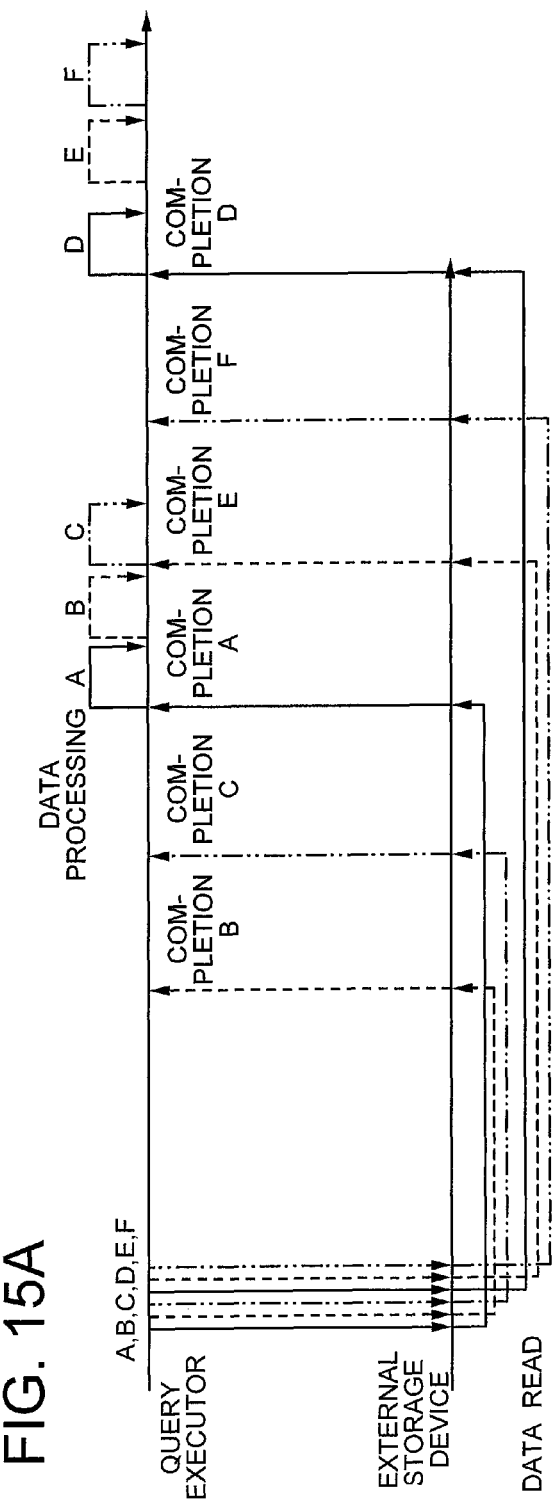
FIG. 15A shows an example of a relation between a data-acquisition process start sequence, a data acquisition sequence and a task resume sequence.
Figure 15B:
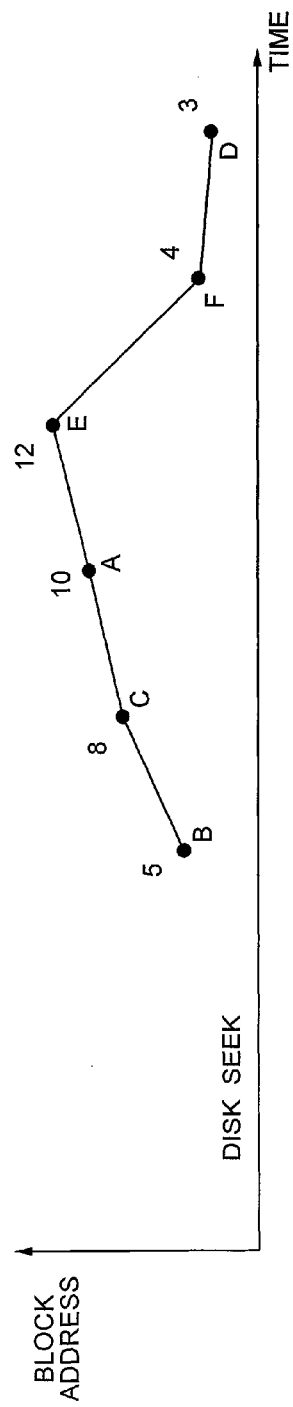
FIG. 15B shows an example of disk seeks indicating the data acquisition sequence.

With the above processes, when the data acquisition process is suspended, a plurality of generated child tasks resume their executions not in the data read order completion but in the data acquisition process start order. Specifically, as illustratively shown in FIG. 15A, if the I/O requests A to F are issued in this order and received in the different order, the data processings are executed in the order of the I/O requests A to F issued. For example, even if data B and C in response to the I/O requests B and C is acquired before data A in response to the I/O request A, execution of the tasks B and C for processing the data B and C is suspended, and execution resumes in the order of tasks B and C after the data A is acquired and execution of the task A processing the data A resumes (this disk seek is illustrated in FIG. 15B providing an effect same as, for example, that of the first embodiment). In this manner, in the third embodiment, execution of each task resumes in the same order as the data acquisition process start order.

The preferred embodiments of the present invention have been described above. The present invention is not limited to the embodiments, but it is obvious that various modifications are possible without departing from the gist of the present invention.

For example, in the second embodiment, upon reception of a predetermined cancel command of a different type, the I/O optimizer 27 may extract the I/O request designated by the cancel command or all I/O requests left in the out-of-schedule queue 61A, from the out-of-schedule queue 61A, and put the extracted I/O request or requests in the schedule queue 61B. Further, for example, in each embodiment, the processes of DBMS 5 may be executed by the processor which read a task. Specifically, for example, a processor executing a parent task generates a child task in the storage resource (e.g., memory) of the database server 1, and reads and executes the child task, so that the processes, for example, at S11 and succeeding steps, can be executed.

Further, for example, the task manager 13 may calculate the number of remaining steps (e.g., the number of OPes remaining down to the last OP) at a predetermined timing in accordance with the query plan and raise the priority degree of the task having a smaller number of remaining steps. In this case, for example, in the processes at S2 and S3 shown in FIG. 3, a child task can be generated at higher priority by the task having the raised priority degree. The task having the raised priority degree can insert the issued I/O requests into the out-of-schedule queue 61A.

Further, for example, in the second embodiment, instead of two types of the schedule queue and out-of-schedule queue, three or more queues having different priority degrees may be prepared. In this case, the query executor 9 may determine a schedule flag having a value corresponding to each priority degree of the I/O request, and store the I/O request in the queue corresponding to the determined schedule flag value.

Further, for example, in the second embodiment, the I/O optimizer 27 may be provided outside DBMS 5. Specifically, for example, the I/O optimizer 27 may be positioned between DBMS 5 and OS 15. The I/O optimizer 27 can receive a plurality of I/O requests issued from DBMS 5. The I/O optimizer 27 may receive an I/O request from AP 3. The I/O optimizer 27 may reorder the sequence of a plurality of received I/O requests (issued from DBMS 5 or AP 3) to the sequence different from the sequence of received I/O requests, and issue the I/O requests to OS 15 in the reordered sequence.

Further, for example, the database management system may be configured on one computer machine or on a plurality of computer machines. Specifically, for example, the processes of DBMS 5 in each embodiment may be applied in the similar manner to a parallel DBMS operating in parallel on a plurality of computer machines. In a parallel DBMS, after the query generator generates a query plan, processings for the query plan are assigned to a plurality of database servers. Therefore, each database server utilizes the technologies of the invention to execute the assigned processings by generating a plurality of tasks and processing I/O requests in parallel. It is therefore possible to shorten a query execution time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A database management system for managing a database, comprising:
    a query interface for receiving a query to said database;
    a query plan generator connected with said query interface for generating a query plan from said received query, said generated query plan comprising a plurality of database operations necessary for execution of said received query; and
    at least one hardware processor connected with said database and said query plan generator for executing said received query in accordance with said generated query plan,
    wherein said at least one hardware processor:
    executes the following steps for executing said received query: (A) a step of generating a task for executing a database operation associated to said task and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C);

whereby parallel processing of at least two tasks of said plurality of tasks generated in recursive execution of steps (B) and (C) is performed; and after issuing said data read requests for said generated tasks in step (B), suspends execution of said generated tasks and thereafter, upon completion of data read of said data read requests, resumes execution of said generated tasks for starting to execute said database operations associated to said generated tasks with said read data for said generated tasks in the same order that the at least one hardware processor issues said data read requests.

2. A database management system for managing a database according to claim 1, wherein, in resuming execution of a respective task of said generated tasks, resumes execution of said respective task of said generated tasks if the at least one hardware processor has not suspended execution of any task for which the at least one hardware processor issues a data read request before the at least one hardware processor issues said data read request for said respective task of said generated tasks.

3. A database management method for managing a database in a database management system connected to said database via a network, comprising:

a step of receiving a query to said database;

a step of generating a query plan from said received query, said generated query plan comprising a plurality of database operations necessary for execution of said received query;

a step of executing said received query in accordance with said generated query plan;

a step of executing the following steps for executing said received query: (A) a step of generating a task for executing a database operation associated to said task and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C);

a step of performing parallel processing of at least two tasks of said plurality of tasks generated in recursive execution of steps (B) and (C); and a step of, after issuing said data read requests for said generated tasks in step (B), suspending execution of said generated tasks and thereafter, upon completion of data read of said data read requests, resuming execution of said generated tasks for starting to execute said database operations associated to said generated tasks with said read data for said generated tasks in the same order that said data read requests are issued.

4. A database management method according to claim 3, further comprising:

a step of, in resuming execution of a respective task of said generated tasks, resuming execution of said respective task of said generated tasks if execution of any task for which a data read request is issued before said data read request is issued for said respective task of said generated tasks has not been suspended.

5. A database management system for managing a database, comprising:

a query interface for receiving a query to said database;

a query plan generator connected with said query interface for generating a query plan from said received query, said generated query plan comprising at least first, second and third database operations and a sequence thereof necessary for execution of said received query; and at least one hardware processor connected with said database and said query plan generator for executing said received query in accordance with said generated query plan, wherein said at least one hardware processor:

generates a first task for executing a first database operation of said sequence of said database operations, starts to execute said first task, and issues a data read request to a storage device storing said database to read data necessary for said first database operation to be executed for said first task;

after executing said first database operation for said first task, when a plurality of second tasks can be generated, in accordance with a result of execution of said first database operation executed for said first task, for a second database operation of said sequence of said database operations, generates said plurality of second tasks, each second task for executing said second database operation in accordance with said result of execution of said first database operation, starts to execute each of said plurality of second tasks, and issues a data read request to said storage device storing said database to read data necessary for said second database operation to be executed for each of said plurality of second tasks in accordance with said result of execution of said first database operation executed for said first task;

after executing said second database operation for said one of said plurality of second tasks, when a plurality of third tasks can be generated, in accordance with a result of execution of said second database operation executed for said one of said plurality of second tasks, for a third database operation of said sequence of said database operations, generates said plurality of third tasks, each third task for executing said third database operation in accordance with said result of execution of said second database operation, starts to execute each of said plurality of third tasks, and issues a data read request to said storage device storing said database to read data necessary for said third database operation to be executed for each of said plurality of third tasks in accordance with said result of execution of said second database operation executed for said one of said plurality of second tasks;

executes in parallel at least two tasks of said plurality of generated first, second and third tasks; and after issuing said data read requests for said generated tasks, suspends execution of said generated tasks and thereafter, upon completion of data read of said data read requests, resumes execution of said generated tasks for starting to execute said database operations associated to said generated tasks with said read data for said generated tasks in the same order that the at least one hardware processor issues said data read requests.

6. A database management system for managing a database, comprising:
- a query interface for receiving a query to said database;
- a query plan generator connected with said query interface for generating a query plan from said received query, said generated query plan comprising at least first, second and third database operations and a sequence thereof necessary for execution of said received query; and
- at least one hardware processor connected with said database and said query plan generator for executing said received query in accordance with said generated query plan,
- wherein said at least one hardware processor:
- generates a first task for executing a first database operation of said sequence of said database operations, starts to execute said first task, and issues a data read request to a storage device storing said database to read data necessary for said first database operation to be executed for said first task;
- after executing said first database operation for said first task, when a plurality of second tasks can be generated, in accordance with a result of execution of said first database operation executed for said first task, for a second database operation of said sequence of said database operations, generates said plurality of second tasks, each second task for executing said second database operation in accordance with said result of execution of said first database operation, starts to execute each of said plurality of second tasks, and issues a data read request to said storage device storing said database to read data necessary for said second database operation to be executed for each of said plurality of second tasks in accordance with said result of execution of said first database operation executed for said first task;
- after executing said second database operation for said one of said plurality of second tasks, when a plurality of third tasks can be generated, in accordance with a result of execution of said second database operation executed for said one of said plurality of second tasks, for a third database operation of said sequence of said database operations, generates said plurality of third tasks, each third task for executing said third database operation in accordance with said result of execution of said second database operation, starts to execute each of said plurality of third tasks, and issues a data read request to said storage device storing said database to read data necessary for said third database operation to be executed for each of said plurality of third tasks in accordance with said result of execution of said second database operation executed for said one of said plurality of second tasks;
- after issuing said data read request for said generated task, suspends execution of said generated task, and thereafter, upon completion of data read of said data read request issued for said generated task, resumes execution of said generated task for starting to execute said database operation associated to said generated task with said read data for said generated task if the at least one hardware processor has not suspended execution of any task for which the at least one hardware processor issues a data read request before the at least one hardware processor issues said data read request for said generated task; and
- executes in parallel at least two tasks of said plurality of generated first, second and third tasks.

7. A database management method for a database management system connected to a database via a network, comprising:
- a step of receiving a query to said database;
- a step of generating a query plan from said received query, said generated query plan comprising at least first, second and third database operations and a sequence thereof necessary for execution of said received query;
- a step of executing said received query in accordance with said generated query plan;
- a step of generating a first task for executing a first database operation of said sequence of said database operations, starting to execute said first task, and issuing a data read request to a storage device storing said database to read data necessary for said first database operation to be executed for said first task;
- a step of, after executing said first database operation for said first task, when a plurality of second tasks can be generated, in accordance with a result of execution of said first database operation executed for said first task, for a second database operation of said sequence of said database operations, generating said plurality of second tasks, each second task for executing a second database operation in accordance with said result of execution of said first database operation, starting to execute each of said plurality of second tasks, and issuing a data read request to said storage device storing said database to read data necessary for said second database operation to be executed for each of said plurality of second tasks in accordance with said result of execution of said first database operation executed for said first task;
- a step of, after executing said second database operation for said one of said plurality of second tasks, when a plurality of third tasks can be generated, in accordance with a result of execution of said second database operation executed for said one of said plurality of second tasks, for a third database operation of said sequence of said database operations, generating said plurality of third tasks, each third task for executing said third database operation in accordance with said result of execution of said second database operation, starting to execute each of said plurality of third tasks, and issuing a data read request to said storage device storing said database to read data necessary for said third database operation to be executed for each of said plurality of third tasks in accordance with said result of execution of said second database operation executed for said one of said plurality of second tasks;
- a step of executing in parallel at least two tasks of said plurality of generated first, second and third tasks; and
- a step of, after issuing said data read requests for said generated tasks in step (B), suspending execution of said generated tasks and thereafter, upon completion of data read of said data read requests, resuming execution of said generated tasks for starting to execute said database operations associated to said generated tasks with said read data for said generated tasks in the same order that said data read requests are issued.

8. A database management method for a database management system connected to a database via a network, comprising:
- a step of receiving a query to said database;
- a step of generating a query plan from said received query, said generated query plan comprising at least first, second and third database operations and a sequence thereof necessary for execution of said received query;

a step of executing said received query in accordance with said generated query plan;

a step of generating a first task for executing a first database operation of said sequence of said database operations, starting to execute said first task, and issuing a data read request to a storage device storing said database to read data necessary for said first database operation to be executed for said first task;

a step of, after executing said first database operation for said first task, when a plurality of second tasks can be generated, in accordance with a result of execution of said first database operation executed for said first task, for a second database operation of said sequence of said database operations, generating said plurality of second tasks, each second task for executing a second database operation in accordance with said result of execution of said first database operation, starting to execute each of said plurality of second tasks, and issuing a data read request to said storage device storing said database to read data necessary for said second database operation to be executed for each of said plurality of second tasks in accordance with said result of execution of said first database operation executed for said first task;

a step of, after executing said second database operation for said one of said plurality of second tasks, when a plurality of third tasks can be generated, in accordance with a result of execution of said second database operation executed for said one of said plurality of second tasks, for a third database operation of said sequence of said database operations, generating said plurality of third tasks, each third task for executing said third database operation in accordance with said result of execution of said second database operation, starting to execute each of said plurality of third tasks, and issuing a data read request to said storage device storing said database to read data necessary for said third database operation to be executed for each of said plurality of third tasks in accordance with said result of execution of said second database operation executed for said one of said plurality of second tasks;

a step of, after issuing said data read request for said generated task, suspending execution of said generated task, and thereafter, upon completion of data read of said data read request issued for said generated task, resuming execution of said generated task for starting to execute said database operation associated to said generated task with said read data for said generated task if execution of any task for which a data read request is issued before said data read request is issued for said generated task has not been suspended; and a step of executing in parallel at least two tasks of said plurality of generated first, second and third tasks.

9. A database management system for managing a database, comprising:

a query interface for receiving a query to said database;

a query plan generator connected with said query interface for generating a query plan from said received query, said generated query plan comprising a plurality of database operations necessary for execution of said received query; and at least one hardware processor connected with said database and said query plan generator for executing said received query in accordance with said generated query plan, wherein said at least one hardware processor:

executes the following steps for executing said received query: (A) a step of generating a task for executing a database operation associated to said task and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C); and upon completion of data read of said data read request issued by said generated task in step (B), executes said database operation associated to said generated task with said read data for said generated task and thereafter eliminates said generated task, whereby parallel processing of at least two tasks of said plurality of tasks generated in recursive execution of steps (B) and (C) for said received query is performed.

10. A database management system for managing a database, comprising:

a query interface for receiving a query to said database;

a query plan generator for generating a query plan from said received query, said generated query plan comprising a plurality of database operations necessary for execution of said received query; and at least one hardware processor for executing said received query in accordance with said generated query plan, wherein said at least one hardware processor:

executes the following steps for executing said received query: (A) a step of generating a task for executing a database operation and starting to execute said generated task, (B) a step of issuing a data read request to a storage device storing said database to read data necessary for executing said database operation in executing said generated task, (C) when a plurality of tasks can be generated in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C), whereby parallel processing of at least two tasks of said plurality of tasks generated in recursive execution of steps (B) and (C) is performed.

11. A database management method for managing a database in a database management system connected to said database via a network, comprising:

a step of receiving a query to said database;

a step of generating a query plan from said received query, said generated query plan comprising a plurality of database operations necessary for execution of said received query;

a step of executing said received query in accordance with said generated query plan;

a step of executing the following steps for executing said received query: (A) a step of generating a task for executing a database operation associated to said task and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C);

a step of, upon completion of data read of said data read request issued by said generated task in step (B), executing said database operation associated to said generated task with said read data for said generated task and thereafter eliminating said generated task; and a step of performing parallel processing of at least two tasks of said plurality of tasks generated in recursive execution of steps (B) and (C).

12. A database management method for managing a database in a database management system connected to said database via a network, comprising:

a step of receiving a query to said database;

a step of generating a query plan from said received query, said generated query plan comprising a plurality of database operations necessary for execution of said received query;

a step of executing said received query in accordance with said generated query plan;

a step of executing the following steps for executing said received query: (A) a step of generating a task for executing a database operation and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C); and a step of performing parallel processing of at least two tasks of said plurality of tasks generated in recursive execution of steps (B) and (C).

13. One or more non-transitory computer-readable media maintaining instructions that, when executed by one or more processors, program the one or more processors to:

receive a query to said database;

generate a query plan from said received query, said generated query plan comprising a plurality of database operations necessary for execution of said received query;

execute said received query in accordance with said generated query plan;

execute the following steps for executing said received query: (A) a step of generating a task for executing a database operation associated to said task and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C);

perform parallel processing of at least two tasks of said plurality of tasks generated in recursive execution of steps (B) and (C); and after issuing said data read requests for said generated tasks in step (B), suspend execution of said generated tasks and thereafter, upon completion of data read of said data read requests, resume execution of said generated tasks for starting to execute said database operations associated to said generated tasks with said read data for said generated tasks in the same order that said data read requests are issued.

14. One or more non-transitory computer-readable media according to 13, further maintaining instructions that, when executed by one or more processors, program the one or more processors to:

in resuming execution of a respective task of said generated tasks, resume execution of said respective task of said generated tasks if execution of any task for which a data read request is issued before said data read request is issued for said respective task of said generated tasks has not been suspended.

15. One or more non-transitory computer-readable media maintaining instructions that, when executed by one or more processors, program the one or more processors to:

receive a query to said database;

generate a query plan from said received query, said generated query plan comprising at least first, second and third database operations and a sequence thereof necessary for execution of said received query;

execute said received query in accordance with said generated query plan;

generate a first task for executing a first database operation of said sequence of said database operations, starting to execute said first task, and issuing a data read request to a storage device storing said database to read data necessary for said first database operation to be executed for said first task;

after executing said first database operation for said first task, when a plurality of second tasks can be generated, in accordance with a result of execution of said first database operation executed for said first task, for a second database operation of said sequence of said database operations, generate said plurality of second tasks, each second task for executing a second database operation in accordance with said result of execution of said first database operation, start to execute each of said plurality of second tasks, and issue a data read request to said storage device storing said database to read data necessary for said second database operation to be executed for each of said plurality of second tasks in accordance with said result of execution of said first database operation executed for said first task;

after executing said second database operation for said one of said plurality of second tasks, when a plurality of third tasks can be generated, in accordance with a result of execution of said second database operation executed for said one of said plurality of second tasks, for a third database operation of said sequence of said database operations, generate said plurality of third tasks, each third task for executing said third database operation in accordance with said result of execution of said second database operation, start to execute each of said plurality of third tasks, and issue a data read request to said storage device storing said database to read data necessary for said third database operation to be executed for each of said plurality of third tasks in accordance with said result of execution of said second database operation executed for said one of said plurality of second tasks;

execute in parallel at least two tasks of said plurality of generated first, second and third tasks; and after issuing said data read requests for said generated tasks in step (B), suspend execution of said generated tasks and thereafter, upon completion of data read of said data read requests, resume execution of said generated tasks for starting to execute said database operations associated to said generated tasks with said read data for said generated tasks in the same order that said data read requests are issued.

16. One or more non-transitory computer-readable media maintaining instructions that, when executed by one or more processors, program the one or more processors to:

receive a query to said database;

generate a query plan from said received query, said generated query plan comprising at least first, second and third database operations and a sequence thereof necessary for execution of said received query;

execute said received query in accordance with said generated query plan;

generate a first task for executing a first database operation of said sequence of said database operations, start to execute said first task, and issue a data read request to a storage device storing said database to read data necessary for said first database operation to be executed for said first task;

after executing said first database operation for said first task, when a plurality of second tasks can be generated, in accordance with a result of execution of said first database operation executed for said first task, for a second database operation of said sequence of said database operations, generate said plurality of second tasks, each second task for executing a second database operation in accordance with said result of execution of said first database operation, start to execute each of said plurality of second tasks, and issue a data read request to said storage device storing said database to read data necessary for said second database operation to be executed for each of said plurality of second tasks in accordance with said result of execution of said first database operation executed for said first task;

after executing said second database operation for said one of said plurality of second tasks, when a plurality of third tasks can be generated, in accordance with a result of execution of said second database operation executed for said one of said plurality of second tasks, for a third database operation of said sequence of said database operations, generate said plurality of third tasks, each third task for executing said third database operation in accordance with said result of execution of said second database operation, start to execute each of said plurality of third tasks, and issue a data read request to said storage device storing said database to read data necessary for said third database operation to be executed for each of said plurality of third tasks in accordance with said result of execution of said second database operation executed for said one of said plurality of second tasks;

after issuing said data read request for said generated task, suspend execution of said generated task, and thereafter, upon completion of data read of said data read request issued for said generated task, resume execution of said generated task for starting to execute said database operation associated to said generated task with said read data for said generated task if execution of any task for which a data read request is issued before said data read request is issued for said generated task has not been suspended; and execute in parallel at least two tasks of said plurality of generated first, second and third tasks.

17. One or more non-transitory computer-readable media maintaining instructions that, when executed by one or more processors, program the one or more processors to:

receive a query to said database;

generate a query plan from said received query, said generated query plan comprising a plurality of database operations necessary for execution of said received query;

execute said received query in accordance with said generated query plan;

execute the following steps for executing said received query: (A) a step of generating a task for executing a database operation associated to said task and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C);

upon completion of data read of said data read request issued by said generated task in step (B), execute said database operation associated to said generated task with said read data for said generated task and thereafter eliminating said generated task; and perform parallel processing of at least two tasks of said plurality of tasks generated in recursive execution of steps (B) and (C).

18. One or more non-transitory computer-readable media maintaining instructions that, when executed by one or more processors, program the one or more processors to:

receive a query to said database;

generate a query plan from said received query, said generated query plan; comprising a plurality of database operations necessary for execution of said received query;

execute said received query in accordance with said generated query plan;

execute the following steps for executing said received query: (A) a step of generating a task for executing a database operation and starting to execute said generated task, (B) a step of issuing a data read request to a storage device storing said database to read data necessary for executing said database operation in executing said generated task, (C) when a plurality of tasks can be generated, in accordance with a result of execution of said database operation, for a next database operation which is necessary for executing said received query, a step of generating said plurality of tasks in accordance with said result of execution of said database operation, and (D) a step of recursively executing steps (B) and (C) for each of said plurality of tasks generated in step (C); and perform parallel processing of at least two tasks of said plurality of tasks generated in recursive execution of steps (B) and (C).

* * * * *